US011712655B2

(12) United States Patent
Hill

(10) Patent No.: US 11,712,655 B2
(45) Date of Patent: Aug. 1, 2023

(54) MEMBRANE-BASED HYDROGEN PURIFIERS

(71) Applicant: H2 PowerTech, LLC, Bend, OR (US)

(72) Inventor: Charles R. Hill, Bend, OR (US)

(73) Assignee: H2 PowerTech, LLC, Bend, OR (US)

( * ) Notice: Subject to any disclaimer, the term of this patent is extended or adjusted under 35 U.S.C. 154(b) by 347 days.

(21) Appl. No.: 17/107,523

(22) Filed: Nov. 30, 2020

(65) Prior Publication Data
US 2022/0168687 A1    Jun. 2, 2022

(51) Int. Cl.
B01D 53/22        (2006.01)
H01M 8/0662    (2016.01)
C01B 3/50           (2006.01)

(52) U.S. Cl.
CPC ............ *B01D 53/227* (2013.01); *C01B 3/503* (2013.01); *H01M 8/0687* (2013.01); *B01D 2053/222* (2013.01); *C01B 2203/0405* (2013.01)

(58) Field of Classification Search
None
See application file for complete search history.

(56) References Cited

U.S. PATENT DOCUMENTS

| | | |
|---|---|---|
| 1,306,221 A | 6/1919 | Ellis |
| 1,782,824 A | 11/1930 | Hechenbleikner |
| 1,848,466 A | 3/1932 | Edmonds |
| 2,132,151 A | 10/1938 | Fenske et al. |
| 2,450,804 A | 10/1948 | Loy |
| 2,609,059 A | 9/1952 | Benedict |
| 2,824,620 A | 2/1958 | De Rosset |
| 3,094,391 A | 6/1963 | Mader |

(Continued)

FOREIGN PATENT DOCUMENTS

| | | |
|---|---|---|
| CA | 1238866 | 7/1988 |
| CA | 2393475 | 9/2001 |

(Continued)

OTHER PUBLICATIONS

US 6,340,380 B1, 01/2002, Frost et al. (withdrawn)

(Continued)

*Primary Examiner* — Jason M Greene
(74) *Attorney, Agent, or Firm* — Kolitch Romano Dascenzo Gates, LLC

(57) ABSTRACT

Membrane-based hydrogen purifiers having graphite frame members. The purifiers include a hydrogen-separation membrane module with at least one membrane cell containing at least one hydrogen-selective membrane, which includes a permeate face and an opposed mixed gas face, and a fluid-permeable support structure that physically contacts and supports at least a central region of the permeate face. The membrane cell further includes a permeate-side frame member and a mixed gas-side frame member. The permeate-side frame member is interposed between the hydrogen-selective membrane and the fluid-permeable support structure to physically contact a peripheral region of the permeate face and a peripheral region of the fluid-permeable support structure. The mixed gas-side frame member physically contacts a peripheral region of the mixed gas face. At least one of the permeate-side frame member and the mixed gas-side frame member is a graphite frame member.

22 Claims, 8 Drawing Sheets

(56) References Cited

U.S. PATENT DOCUMENTS

| | | |
|---|---|---|
| 3,144,312 A | 8/1964 | Mertens |
| 3,208,198 A | 9/1965 | Rubin |
| 3,238,704 A | 3/1966 | Straschil et al. |
| 3,336,730 A | 8/1967 | McBride et al. |
| 3,338,681 A | 8/1967 | Kordesch |
| 3,344,586 A | 10/1967 | Langley et al. |
| 3,350,176 A | 10/1967 | Green et al. |
| 3,356,538 A | 12/1967 | Miekka et al. |
| 3,368,329 A | 2/1968 | Eguchi et al. |
| 3,428,476 A | 2/1969 | Langley et al. |
| 3,439,474 A | 4/1969 | McKinley |
| 3,447,288 A | 6/1969 | Juda et al. |
| 3,450,500 A | 6/1969 | Setzer et al. |
| 3,469,372 A | 9/1969 | Yamauchi et al. |
| 3,469,944 A | 9/1969 | Bocard et al. |
| 3,486,301 A | 12/1969 | Bonnet |
| 3,520,803 A | 7/1970 | Iaconelli |
| 3,522,019 A | 7/1970 | Buswell et al. |
| 3,524,819 A | 8/1970 | Guerrieri |
| 3,534,531 A | 10/1970 | Eguchi et al. |
| 3,564,819 A | 2/1971 | Neulander et al. |
| 3,589,171 A | 6/1971 | Haley |
| 3,655,448 A | 4/1972 | Setzer |
| 3,665,680 A | 5/1972 | Heuser |
| 3,713,270 A | 1/1973 | Farr et al. |
| 3,761,382 A | 9/1973 | Hammond et al. |
| 3,782,904 A | 1/1974 | Fletcher |
| 3,787,038 A | 1/1974 | Tesner et al. |
| 3,791,106 A | 2/1974 | Haley |
| 3,797,202 A | 3/1974 | Neulander et al. |
| 3,837,146 A | 9/1974 | Faure et al. |
| 3,839,110 A | 10/1974 | Shankoff |
| 3,849,076 A | 11/1974 | Gryaznov et al. |
| 3,881,891 A | 5/1975 | Goltsov et al. |
| 3,881,897 A | 5/1975 | Faure et al. |
| 3,920,416 A | 11/1975 | Houseman |
| 3,955,941 A | 5/1976 | Houseman et al. |
| 3,972,695 A | 8/1976 | Buckley et al. |
| 3,980,452 A | 9/1976 | Krumm et al. |
| 3,982,910 A | 9/1976 | Houseman et al. |
| 4,003,343 A | 1/1977 | Lee |
| 4,003,725 A | 1/1977 | Bunn, Jr. et al. |
| 4,056,373 A | 11/1977 | Rubin |
| 4,078,985 A | 3/1978 | Takeuchi |
| 4,084,934 A | 4/1978 | Kumazawa |
| 4,098,959 A | 7/1978 | Fanciullo |
| 4,098,960 A | 7/1978 | Gagnon |
| 4,127,393 A | 11/1978 | Timmins et al. |
| 4,132,668 A | 1/1979 | Gryaznov et al. |
| 4,134,739 A | 1/1979 | Gulden et al. |
| 4,175,165 A | 11/1979 | Adlhart |
| 4,197,152 A | 4/1980 | Palty et al. |
| 4,214,969 A | 7/1980 | Lawrance |
| 4,238,403 A | 12/1980 | Pinto |
| 4,243,536 A | 1/1981 | Prölss |
| 4,248,688 A | 2/1981 | Gartner et al. |
| 4,254,086 A | 3/1981 | Sanders |
| 4,302,177 A | 11/1981 | Fankhanel et al. |
| 4,313,013 A | 1/1982 | Harris |
| 4,315,893 A | 2/1982 | McCallister |
| 4,319,923 A | 3/1982 | Falanga et al. |
| 4,329,157 A | 5/1982 | Dobo et al. |
| 4,331,520 A | 5/1982 | Juda et al. |
| 4,349,613 A | 9/1982 | Winsel |
| 4,381,641 A | 5/1983 | Madgavkar et al. |
| 4,387,434 A | 6/1983 | Moncrief, Jr. et al. |
| 4,400,182 A | 8/1983 | Davies et al. |
| 4,417,905 A | 11/1983 | Banks et al. |
| 4,422,911 A | 12/1983 | Juda et al. |
| 4,430,304 A | 2/1984 | Spurrier et al. |
| 4,444,158 A | 4/1984 | Yoon |
| 4,466,253 A | 8/1984 | Jaster |
| 4,468,235 A | 8/1984 | Hill |
| 4,472,176 A | 9/1984 | Rubin |
| 4,473,622 A | 9/1984 | Chludzinski et al. |
| 4,504,447 A | 3/1985 | Spurrier et al. |
| 4,533,607 A | 8/1985 | Sederquist |
| 4,553,981 A | 11/1985 | Fuderer |
| 4,567,857 A | 2/1986 | Houseman et al. |
| 4,589,891 A | 5/1986 | Iniotakis et al. |
| 4,613,436 A | 9/1986 | Wight et al. |
| 4,642,273 A | 2/1987 | Sasaki |
| 4,644,751 A | 2/1987 | Hsu |
| 4,650,814 A | 3/1987 | Keller |
| 4,654,063 A | 3/1987 | Auvil et al. |
| 4,655,797 A | 4/1987 | Iniotakis et al. |
| 4,657,828 A | 4/1987 | Tajima |
| 4,659,634 A | 4/1987 | Struthers |
| 4,670,359 A | 6/1987 | Beshty et al. |
| 4,684,581 A | 8/1987 | Struthers |
| 4,693,945 A | 9/1987 | Ohyauchi et al. |
| 4,699,637 A | 10/1987 | Iniotakis et al. |
| 4,713,234 A | 12/1987 | Weirich et al. |
| 4,751,151 A | 6/1988 | Healy et al. |
| 4,781,241 A | 11/1988 | Misage et al. |
| 4,788,004 A | 11/1988 | Pinto et al. |
| 4,810,485 A | 3/1989 | Marianowski et al. |
| 4,820,594 A | 4/1989 | Sugita et al. |
| 4,838,897 A | 6/1989 | Amano et al. |
| 4,849,187 A | 7/1989 | Uozu et al. |
| 4,865,624 A | 9/1989 | Okada |
| 4,880,040 A | 11/1989 | Pierson et al. |
| 4,904,455 A | 2/1990 | Karafian et al. |
| 4,904,548 A | 2/1990 | Tajima |
| 4,946,667 A | 8/1990 | Beshty |
| 4,981,676 A | 1/1991 | Minet et al. |
| 4,999,107 A | 3/1991 | Guerif |
| 5,030,661 A | 7/1991 | Lywood |
| 5,032,365 A | 7/1991 | Aono et al. |
| 5,051,113 A | 9/1991 | Nemser |
| 5,126,045 A | 6/1992 | Kohlheb et al. |
| 5,139,541 A | 8/1992 | Edlund |
| 5,158,581 A | 10/1992 | Coplan |
| 5,174,900 A | 12/1992 | Nichols et al. |
| 5,205,841 A | 4/1993 | Vaiman |
| 5,207,906 A | 5/1993 | Auvil et al. |
| 5,210,059 A | 5/1993 | Matturo et al. |
| 5,215,729 A | 6/1993 | Buxbaum |
| 5,217,506 A | 6/1993 | Edlund et al. |
| 5,225,080 A | 7/1993 | Karbachsch et al. |
| 5,226,928 A | 7/1993 | Makabe et al. |
| 5,229,102 A | 7/1993 | Minet et al. |
| 5,259,870 A | 11/1993 | Edlund |
| 5,306,577 A | 4/1994 | Sprouse |
| 5,326,550 A | 7/1994 | Adris et al. |
| 5,335,628 A | 8/1994 | Dunbar |
| 5,344,721 A | 9/1994 | Sonai et al. |
| 5,354,547 A | 10/1994 | Rao et al. |
| 5,376,167 A | 12/1994 | Broutin et al. |
| 5,382,271 A | 1/1995 | Ng et al. |
| 5,393,325 A | 2/1995 | Edlund |
| 5,395,425 A | 3/1995 | Brown |
| 5,401,589 A | 3/1995 | Palmer et al. |
| 5,417,051 A | 5/1995 | Ankersmit et al. |
| RE35,002 E | 7/1995 | Matsubara et al. |
| 5,432,710 A | 7/1995 | Ishimaru et al. |
| 5,449,848 A | 9/1995 | Itoh |
| 5,458,857 A | 10/1995 | Collins et al. |
| 5,468,283 A | 11/1995 | French et al. |
| 5,498,278 A | 3/1996 | Edlund |
| 5,500,122 A | 3/1996 | Schwartz |
| 5,509,942 A | 4/1996 | Dodge |
| 5,516,344 A | 5/1996 | Corrigan |
| 5,518,530 A | 5/1996 | Sakai et al. |
| 5,520,807 A | 5/1996 | Myrna et al. |
| 5,525,322 A | 6/1996 | Willms |
| 5,527,632 A | 6/1996 | Gardner |
| 5,536,405 A | 7/1996 | Myrna et al. |
| 5,580,523 A | 12/1996 | Bard |
| 5,589,599 A | 12/1996 | McMullen et al. |
| 5,612,012 A | 3/1997 | Soma et al. |
| 5,614,001 A | 3/1997 | Kosaka et al. |
| 5,616,430 A | 4/1997 | Aoyama |
| 5,634,354 A | 6/1997 | Howard et al. |

(56) References Cited

U.S. PATENT DOCUMENTS

| | | |
|---|---|---|
| 5,637,259 A | 6/1997 | Galuszka et al. |
| 5,637,414 A | 6/1997 | Inoue et al. |
| 5,639,431 A | 6/1997 | Shirasaki et al. |
| 5,645,626 A | 7/1997 | Edlund et al. |
| 5,658,681 A | 8/1997 | Sato et al. |
| 5,677,073 A | 10/1997 | Kawatsu |
| 5,679,249 A | 10/1997 | Fendya et al. |
| 5,705,082 A | 1/1998 | Hinson |
| 5,705,916 A | 1/1998 | Rudbeck et al. |
| 5,712,052 A | 1/1998 | Kawatsu |
| 5,714,276 A | 2/1998 | Okamoto |
| 5,734,092 A | 3/1998 | Wang et al. |
| 5,738,708 A | 4/1998 | Peachey et al. |
| 5,741,474 A | 4/1998 | Isomura et al. |
| 5,741,605 A | 4/1998 | Gillett et al. |
| 5,759,712 A | 6/1998 | Hockaday |
| 5,780,179 A | 7/1998 | Okamoto |
| 5,782,960 A | 7/1998 | Ogawa et al. |
| 5,795,666 A | 8/1998 | Johnssen |
| 5,798,186 A | 8/1998 | Fletcher et al. |
| 5,811,065 A | 9/1998 | Sterenberg |
| 5,814,112 A | 9/1998 | Elliot et al. |
| 5,821,185 A | 10/1998 | White et al. |
| 5,833,723 A | 11/1998 | Kuwabara et al. |
| 5,858,314 A | 1/1999 | Hsu et al. |
| 5,861,137 A | 1/1999 | Edlund |
| 5,874,051 A | 2/1999 | Heil et al. |
| 5,888,273 A | 3/1999 | Buxbaum |
| 5,891,222 A | 4/1999 | Hilgendorff et al. |
| 5,897,766 A | 4/1999 | Kawatsu |
| 5,897,970 A | 4/1999 | Isomura et al. |
| 5,904,754 A | 5/1999 | Juda et al. |
| 5,931,987 A | 8/1999 | Buxbaum |
| 5,932,181 A | 8/1999 | Kim et al. |
| 5,938,800 A | 8/1999 | Verrill et al. |
| 5,944,197 A | 8/1999 | Baltzer et al. |
| 5,980,989 A | 11/1999 | Takahashi et al. |
| 5,985,474 A | 11/1999 | Chen et al. |
| 5,997,594 A | 12/1999 | Edlund et al. |
| 5,998,053 A | 12/1999 | Diethelm |
| 6,001,249 A | 12/1999 | Bailey et al. |
| 6,007,931 A | 12/1999 | Fuller et al. |
| 6,042,956 A | 3/2000 | Lenel |
| 6,045,772 A | 4/2000 | Szydlowski et al. |
| 6,045,933 A | 4/2000 | Okamoto |
| 6,054,229 A | 4/2000 | Hsu et al. |
| 6,077,620 A | 6/2000 | Pettit |
| 6,083,637 A | 7/2000 | Walz et al. |
| 6,103,028 A | 8/2000 | Juda et al. |
| 6,103,411 A | 8/2000 | Matsubayashi et al. |
| 6,152,995 A | 11/2000 | Edlund |
| 6,165,633 A | 12/2000 | Negishi |
| 6,168,650 B1 | 1/2001 | Buxbaum |
| 6,171,574 B1 | 1/2001 | Juda et al. |
| 6,180,272 B1 | 1/2001 | Byrne et al. |
| 6,183,543 B1 | 2/2001 | Buxbaum |
| 6,183,895 B1 | 2/2001 | Kudo et al. |
| 6,187,066 B1 | 2/2001 | Benz et al. |
| 6,190,623 B1 | 2/2001 | Sanger et al. |
| 6,201,029 B1 | 3/2001 | Waycuilis |
| 6,221,117 B1 | 4/2001 | Edlund et al. |
| 6,231,831 B1 | 5/2001 | Autenrieth et al. |
| 6,238,465 B1 | 5/2001 | Juda et al. |
| 6,242,120 B1 | 6/2001 | Herron |
| 6,319,306 B1 | 11/2001 | Edlund et al. |
| 6,332,913 B1 | 12/2001 | Breitschwerdt et al. |
| 6,350,297 B1 | 2/2002 | Doyle et al. |
| 6,375,906 B1 | 4/2002 | Edlund et al. |
| 6,376,113 B1 | 4/2002 | Edlund et al. |
| 6,379,524 B1 | 4/2002 | Lee et al. |
| 6,383,670 B1 | 5/2002 | Edlund et al. |
| 6,395,405 B1 | 5/2002 | Buxbaum |
| 6,419,726 B1 | 7/2002 | Frost et al. |
| 6,458,189 B1 | 10/2002 | Edlund et al. |
| 6,461,408 B2 | 10/2002 | Buxbaum |
| 6,494,937 B1 | 12/2002 | Edlund et al. |
| 6,495,277 B1 | 12/2002 | Edlund et al. |
| 6,537,352 B2 | 3/2003 | Edlund et al. |
| 6,547,858 B1 | 4/2003 | Edlund et al. |
| 6,562,111 B2 | 5/2003 | Edlund et al. |
| 6,569,227 B2 | 5/2003 | Edlund et al. |
| 6,596,057 B2 | 7/2003 | Edlund et al. |
| 6,602,325 B1 | 8/2003 | Frost et al. |
| 6,632,270 B2 | 10/2003 | Edlund et al. |
| 6,660,069 B2 | 12/2003 | Sato et al. |
| 6,719,831 B2 | 4/2004 | Edlund et al. |
| 6,719,832 B2 | 4/2004 | Edlund et al. |
| 6,723,156 B2 | 4/2004 | Edlund et al. |
| 6,761,755 B2 | 7/2004 | Jantsch et al. |
| 6,767,389 B2 | 7/2004 | Edlund et al. |
| 6,783,741 B2 | 8/2004 | Edlund et al. |
| 6,824,593 B2 | 11/2004 | Edlund et al. |
| 6,835,232 B2 | 12/2004 | Frost et al. |
| 6,890,672 B2 | 5/2005 | Dickman et al. |
| 7,056,369 B2 | 6/2006 | Beisswenger et al. |
| 7,297,183 B2 | 11/2007 | Edlund et al. |
| 7,323,040 B2 | 1/2008 | Poschmann |
| 7,972,420 B2 | 7/2011 | Pledger et al. |
| 8,030,600 B2 | 10/2011 | Kimura |
| 10,476,093 B2 | 11/2019 | Hill et al. |
| 2002/0103453 A1 | 8/2002 | Burbank et al. |
| 2003/0167690 A1 | 9/2003 | Edlund et al. |
| 2004/0040862 A1* | 3/2004 | Kosek ............... C01B 3/503 |
| | | 205/637 |
| 2004/0083890 A1 | 5/2004 | Edlund et al. |
| 2004/0126643 A1 | 7/2004 | Kinkelaar et al. |
| 2004/0148857 A1 | 8/2004 | Strizki et al. |
| 2004/0155065 A1 | 8/2004 | Kinkelaar et al. |
| 2004/0231516 A1 | 11/2004 | Edlund et al. |
| 2004/0241509 A1 | 12/2004 | Taguchi et al. |
| 2005/0039400 A1 | 2/2005 | Lau et al. |
| 2005/0188843 A1 | 9/2005 | Edlund et al. |
| 2006/0037476 A1 | 2/2006 | Edlund et al. |
| 2006/0090397 A1 | 5/2006 | Edlund et al. |
| 2013/0108514 A1 | 5/2013 | Edlund et al. |
| 2016/0158693 A1 | 6/2016 | Ouchi et al. |
| 2017/0301940 A1* | 10/2017 | Hill ................ B01D 63/082 |
| 2018/0105422 A1 | 4/2018 | Yu et al. |
| 2019/0210882 A1* | 7/2019 | Bowes ............... B01J 8/1827 |

FOREIGN PATENT DOCUMENTS

| | | |
|---|---|---|
| EP | 0434562 A1 | 6/1991 |
| EP | 1065741 A2 | 1/2001 |
| GB | 1032131 | 6/1966 |
| JP | 45-14404 | 5/1970 |
| JP | 45-2642 | 9/1970 |
| JP | 57-145276 | 9/1982 |
| JP | 1-145302 | 6/1989 |
| JP | 1-145303 | 6/1989 |
| JP | 1-262903 | 10/1989 |
| JP | 4-163860 | 6/1992 |
| JP | 4-338101 | 11/1992 |
| JP | 6-134244 | 5/1994 |
| JP | 10-263372 | 10/1998 |
| JP | 2003-34506 | 7/2003 |
| JP | 2004-130226 | 4/2004 |
| JP | 2009-000658 | 1/2009 |
| JP | 2009-280426 | 12/2009 |
| JP | 2010-137160 | 6/2010 |
| KR | 20130047207 | 5/2013 |
| WO | WO 97/25649 | 7/1997 |
| WO | WO 97/43796 | 11/1997 |
| WO | WO 99/30806 | 6/1999 |
| WO | WO 99/65097 | 12/1999 |
| WO | WO 00/04600 | 1/2000 |
| WO | WO 00/27507 | 5/2000 |
| WO | WO 01/12539 | 2/2001 |
| WO | WO 01/28662 | 4/2001 |
| WO | WO 01/64321 | 9/2001 |
| WO | WO 01/70379 | 9/2001 |
| WO | WO 01/83086 | 11/2001 |

(56) References Cited

FOREIGN PATENT DOCUMENTS

| | | |
|---|---|---|
| WO | WO 02/026365 | 4/2002 |
| WO | WO 04/14529 | 2/2004 |
| WO | WO 16/178849 | 11/2016 |

OTHER PUBLICATIONS

English-language abstract of Japanese Patent No. 57-145276, 1982.
English-language abstract of Japanese Patent No. 1-145302, 1989.
English-language abstract of Japanese Patent No. 1-145303, 1989.
English-language abstract of Japanese Patent No. 1-262903, 1989.
English-language abstract of Japanese Patent No. 4-163860, Jun. 1992.
English-language abstract of Japanese Patent No. 4-338101, 1992.
English-language abstract of Japanese Patent Publication No. 05132301, 1993.
English-language abstract of Japanese Patent Publication No. 05147902, 1993.
English-language abstract of Japanese Patent Publication No. 06040701, 1994.
English-language abstract of Japanese Patent No. 6-134244, 1994.
English-language abstract of Japanese Patent Publication No. 06176779, 1994.
English-language abstract of Japanese Patent Publication No. 06345408, 1994.
English-language abstract of Japanese Patent Publication No. 0710910, 1995.
English-language abstract of Japanese Patent Publication No. 07057758, 1995.
English-language abstract of Japanese Patent Publication No. 08287932, 1996.
English-language abstract of German language PCT Patent Publication No. WO 97/43796, 1997.
English-language abstract of Great Britain Patent No. 2,305,186, 1997.
English-language abstract of Japanese Patent No. 10-263372, 1998.
English-language abstract of Japanese Patent Publication No. 11116202, 1999.
English-language abstract of German language PCT Patent Publication Serial No. WO 00/04600, Jan. 2000.
English-language abstract of German language PCT Patent Application Serial No. WO 01/64321, 2001.
English-language abstract of Japanese Patent No. JP2003-34506, Jul. 2, 2003.
English-language abstract of Japanese Patent No. JP2004-130226, Apr. 30, 2004.
English-language abstract of Japanese Patent No. JP2009-000658, Jan. 8, 2009.
English-language abstract of Japanese Patent Publication No. 2009-280426A, Dec. 3, 2009.
English-language abstract of Japanese Patent Publication No. 2010-137160A, Jun. 24, 2010.
English-language abstract of Korean Patent Publication No. 20130047207, May 5, 2013.
Adris, A. M., et al., "A Fluidized Bed Membrane Reactor for the Steam Reforming of Methane," The Canadian Journal of Chemical Engineering, vol. 69, pp. 1061-1070 (Oct. 1991).
Amphlett, J. C., et al., "On Board Hydrogen Purification for Steam Reformer/PEM Fuel Cell Vehicle Power Plants," Energy Progress X, Proceedings of the 10th World Hydrogen Energy Conference, Cocoa Beach, Florida, U.S.A., vol. 3, pp. 1681-1690 (Jun. 1994).
Amphlett, J. C., et al., "Simulation of a 250 kW Diesel Fuel Processor/PEM Fuel Cell System," Fifth Grove Fuel Cell Symposium, Commonwealth Institute, London, U.K., p. 8 (Sep. 22-25, 1997).
Chai, M., et al., "Promotion of Methane Steam Reforming Using Ruthenium-Dispersed Microporous Alumina Membrane Reactor," Chemistry Letters, The Chemical Society of Japan, pp. 41-44 (1993).
"Compact, Lightweight Fuel Reformer for Fuel Cells," Argonne National Laboratory/U.S. Department of Energy (Jul. 1996).
Edlund, Dr. David and William Pledger, "Development of a Compact and Economical Steam Reformer for Fuel-Cell Systems," Fifth Grove Fuel Cell Symposium, Commonwealth Institute, London, U.K., p. 6 (Sep. 22-23, 1997).
Edlund, David J. and William A. Pledger, "The Practical Use of Metal-Membrane Reactors for Industrial Applications," The 1995 Membrane Technology Reviews, pp. 89-97 (Nov. 1994).
Emonts, B., et al., "Compact Methanol Reformer Test for Fuel-Cell Powered Light-Duty Vehicles," Fifth Grove Fuel Cell Symposium, Commonwealth Institute, London, U.K., p. 42 (Sep. 22-25, 1997).
Jørgensen, S. Lægsgaard, et al., "Application of Pd-Membranes for the Production of Pure Hydrogen in Methanol-Based Fuel Cell Powered Vehicles," Proceedings of Fourth Workshop: Optimisation of Catalytic Membrane Reactor Systems, ESF Network, Catalytic Membrane Reactors, Oslo, Norway, pp. 51-57 (May 30-31, 1997).
Knapton, A. G., "Palladium Alloys for Hydrogen Diffusion Membranes," Platinum Metals Review, vol. 21, 44-50 (1977).
Ledjeff-Hey, K., et al., "Compact Hydrogen Production Systems for Solid Polymer Fuel Cells," Fifth Grove Fuel Cell Symposium, Commonwealth Institute, London, U.K., p. 17 (Sep. 22-25, 1997).
Menzer, R., et al., "Fuel Processing in Fuel Cell Systems for Mobile Applications—Gasoline as Energy Carrier On-Bord," Fifth Grove Fuel Cell Symposium, Commonwealth Institute, London, U.K., (no page No.), (Sep. 22-25, 1997).
Minet, R. G., et al., "Experimental Studies of A Ceramic Membrane Reactor for the Steam/Methane Reaction at Moderate Temperatures (400-700° C.)," Symposium on Natural Gas Upgrading II Presented before The Division of Petroleum Chemistry, Inc., Meeting of American Chemical Society, San Francisco, California, U.S.A., pp. 245-248 (Apr. 1992).
Oertel, Michael, et al., "Steam Reforming of Natural Gas with Integrated Hydrogen Separation for Hydrogen Production," Chemical Engineering Techology, vol. 10, pp. 248-255 (1987).
Piwetz et al., "Hydrodesulfurization and Prereforming of Logistic Fuels for Use in Fuel Cell Applications," presented at the 1996 Fuel Cell Seminar held Nov. 17-20, 1996 in Orlando, Florida, pp. 780-783.
Privette et al., "Status of SOFCo SOFC Technology Development," presented at the 1996 Fuel Cell Seminar held Nov. 17-20, 1996 in Orlando, Florida, pp. 206-209.
Shu, J., et al., "Catalytic Palladium-Based Membrane Reactors: A Review," The Canadian Journal of Chemical Engineering, vol. 69, pp. 1036-1060 (Oct. 1991).
Teagan, W. P., et al., "Cost Reduction of Fuel Cells for Transportation Applications—Fuel Processing Options," Fifth Grove Fuel Cell Symposium, Commonwealth Institute, London, U.K. (Sep. 22-25, 1997).
Machine translation of WO 02/026365, Apr. 2002.
NeoGraf Solutions, LLC, GRAFOIL GTA Flexible Graphite Technical Data Sheet 435, Dec. 19, 2017.
NeoGraf Solutions, LLC, GRAFOIL GTB Flexible Graphite Technical Data Sheet 436, Dec. 19, 2017.

\* cited by examiner

MEMBRANE-BASED HYDROGEN PURIFIERS

FIELD OF DISCLOSURE

The present disclosure relates to membrane-based hydrogen purifiers and more particularly to membrane-based hydrogen purifiers having graphite frame members.

BACKGROUND

Membrane-based hydrogen purifiers are devices that utilize one or more hydrogen-selective membranes to separate hydrogen gas from a mixture of gasses. The hydrogen-selective membranes are permeable to hydrogen gas but are impermeable to other gasses, such that the hydrogen-selective membranes may separate hydrogen gas from the mixture of gasses by selectively permitting hydrogen gas to diffuse through the membrane. The hydrogen gas separated by hydrogen purifiers may be stored or utilized as a fuel for various energy-producing devices, such as fuel cell stacks and the like.

Membrane-based hydrogen purifiers generally include a membrane support assembly that supports the hydrogen-selective membranes and may form various seals within the hydrogen purifier that serve to partition the hydrogen gas separated by the hydrogen-selective membrane from the other gasses. More specifically, the membrane support assembly may include one or more membrane-contacting frame members, such as gaskets, that physically contact at least a peripheral region of the hydrogen-selective membrane and may be compressed against the hydrogen-selective membrane to form a seal therewith. With this in mind, the composition of the frame members may influence the efficiency and rate at which the hydrogen purifiers separate the hydrogen gas from the mixture of gasses, as well as the longevity of the hydrogen-selective membranes. More specifically, conventional frame members often include impurities that damage or otherwise hinder operation of the hydrogen-selective membrane that the frame member supports, and thereby negatively impact the performance of the hydrogen purifier.

For example, conventional frame members may include particulate that may form perforations in the hydrogen-selective membrane when the conventional frame member contacts and supports the hydrogen-selective membrane within the hydrogen purifier. Such perforations may decrease the efficiency of the hydrogen selective membrane and/or require replacement of the hydrogen-selective membrane. As another example, conventional frame members may include chemical impurities that may interact with the hydrogen-selective membrane and decrease the hydrogen permeance of the hydrogen-selective membrane. This decrease in hydrogen permeance may decrease the rate at which the hydrogen-purifier may purify the hydrogen gas. Thus, a need exists for hydrogen purifiers having improved membrane-contacting frame members, which may include decreased particulate and/or decreased chemical impurities, and which may improve the efficiency and/or rate at which the hydrogen purifiers may purify hydrogen gas and/or improve the longevity of the hydrogen-selective membranes.

SUMMARY

The present disclosure is directed to membrane-based hydrogen purifiers having graphite frame members. The membrane-based hydrogen purifiers include a hydrogen-separation membrane module that includes at least one membrane cell. The membrane cell includes a hydrogen-selective membrane defining a permeate face and an opposed mixed gas face. The membrane cell further includes a mixed gas-side frame member and a fluid-permeable support structure that physically contacts and supports at least a central region of the permeate face of the hydrogen-selective membrane. The membrane cell further includes a permeate-side frame member and a mixed gas-side frame member. The permeate-side frame member is interposed between the hydrogen-selective membrane and the fluid-permeable support structure such that the permeate-side frame member physically contacts a peripheral region of the permeate face and a peripheral region of the fluid-permeable support structure. The mixed gas-side frame member physically contacts a peripheral region of the mixed gas face. At least one of the permeate-side frame member and the mixed gas-side frame member is a graphite frame member. The graphite frame member may include at least a minimum threshold weight percentage of carbon, less than a threshold composition of a granular particulate, granular particulate that is a fine granular particulate, and/or at most a threshold maximum composition of one or more impurities. The membrane cell may include a pair of the hydrogen-selective membranes, and a corresponding pair of fluid-permeable support structures, permeate-side frame members, and mixed gas-side frame members. The membrane module may include a plurality of membrane cells, and the membrane-based hydrogen purifier may be included in and/or utilized with a fuel processor, a fuel processing system that produces a hydrogen-containing mixed gas stream that is purified by the membrane module, and/or a hydrogen-producing and consuming assembly.

DETAILED DESCRIPTION

Figure 1:
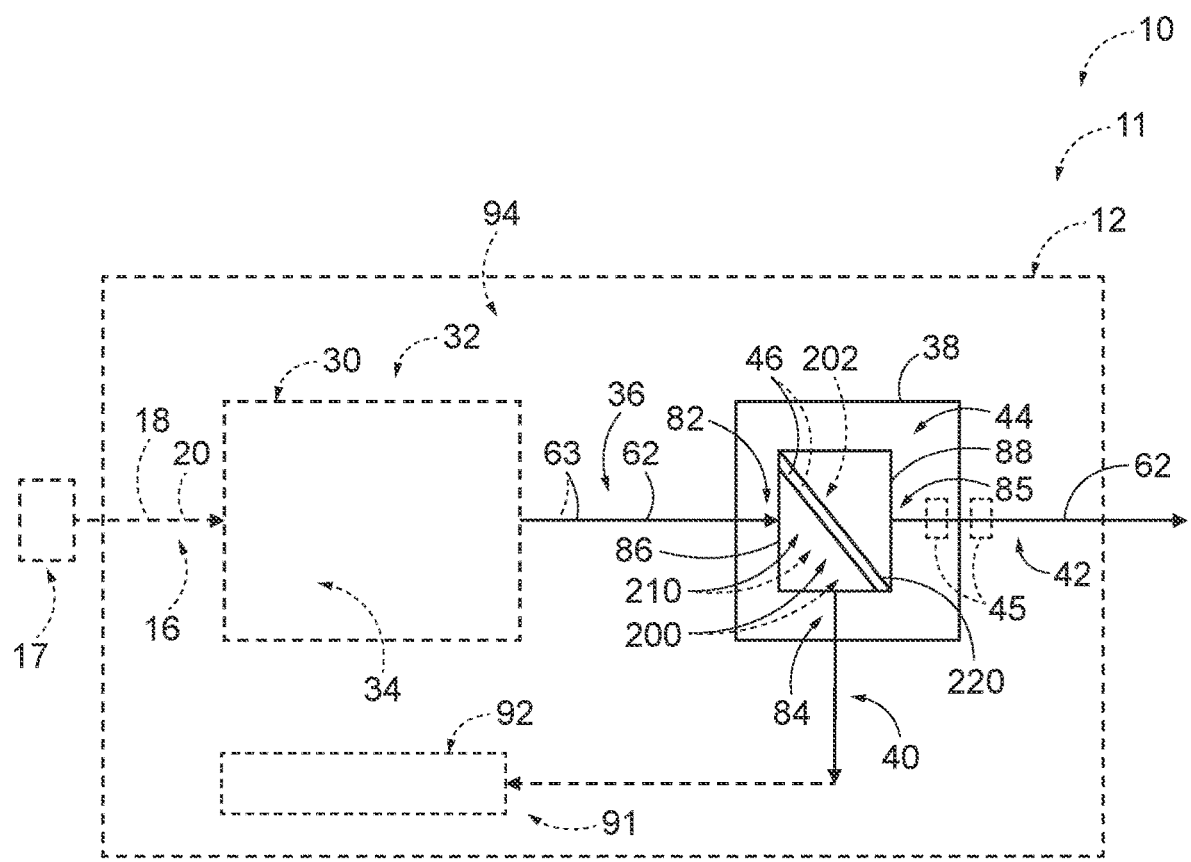
FIG. 1 is a schematic representation of examples of hydrogen purifiers, including hydrogen purifiers optionally forming a portion of a fuel processor and/or a fuel processing system according to the present disclosure.

FIGS. 1-8 provide examples of membrane-based hydrogen purifiers 38, membrane modules 44 of membrane-based hydrogen purifiers 38, fuel processors 12 including and/or utilizing membrane-based hydrogen purifiers 38, hydrogen-producing and consuming assemblies 10 including and/or utilizing membrane-based hydrogen purifiers 38, and/or energy producing and consuming assemblies 13 including and/or utilizing membrane-based hydrogen purifiers according to the present disclosure. Elements that serve a similar, or at least substantially similar, purpose are labelled with like numbers in each of FIGS. 1-8, and these elements may not be discussed in detail herein with reference to each of FIGS. 1-8. Similarly, all elements may not be labelled in each of FIGS. 1-8, but reference numerals associated therewith may be utilized herein for consistency. Elements, components, and/or features that are discussed herein with reference to one or more of FIGS. 1-8 may be included in and/or utilized with any of FIGS. 1-8, without departing from the scope of the present disclosure. In general, elements that are likely to be included in a particular embodiment are illustrated in solid lines, while elements that are optional and/or environmental to the particular embodiment are illustrated in dashed lines. However, elements that are shown in solid lines may not be essential to all embodiments and, in some embodiments, may be omitted without departing from the scope of the present disclosure.

FIG. 1 schematically represents examples of membrane-based hydrogen purifiers 38 according to the present disclosure. As shown, membrane-based hydrogen purifiers 38 are configured to receive a mixed gas stream 36 that includes a mixture of hydrogen gas 62 and one or more other gasses 63. The membrane-based hydrogen purifiers 38 are further configured to separate mixed gas stream 36 into a purified hydrogen stream 42 and a byproduct stream 40. Stated differently, membrane-based hydrogen purifiers 38 may be described as being configured to produce purified hydrogen gas 62 from a mixture of gasses that includes hydrogen gas among other gasses. Membrane-based hydrogen purifiers 38 may be referred to herein as hydrogen purifiers 38 and/or purifiers 38. Membrane-based hydrogen purifiers 38 may be configured to produce pure, or at least substantially pure, hydrogen gas. As used herein, substantially pure hydrogen gas may be greater than 90% pure, greater than 95% pure, greater than 99% pure, greater than 99.5% pure, greater than 99.9% pure, and/or at most 100% pure. Unless otherwise indicated, percentages utilized herein are weight percentages.

Mixed gas stream 36 may be hydrogen rich, include a substantial concentration of hydrogen gas, and/or may include hydrogen gas as a majority component. As used herein, a majority component means a component that is present in a greater percentage, or amount, than other components, and a minority component means a component that is present in a lower percentage, or amount, than at least the majority component. Examples of the other gasses that may be present in mixed gas stream 36 include carbon dioxide, carbon monoxide, and methane. Purified hydrogen stream 42 may include an increased concentration of hydrogen gas relative to mixed gas stream 36 and a decreased concentration of the other gasses relative to mixed gas stream 36. Accordingly, byproduct stream 40 may include a decreased concentration of hydrogen gas relative to mixed gas stream 36 and an increased concentration of the other gasses relative to mixed gas stream 36. Purified hydrogen stream 42 may contain at least a substantial portion, or a majority, of the hydrogen gas in mixed gas stream 36, and byproduct stream 40 may contain at least a substantial portion of, or a majority of, the other gasses. That said, byproduct stream 40 may include a non-zero amount or concentration of hydrogen gas, and purified hydrogen stream 42 may include a non-zero amount of the other gasses. In view of the above, purified hydrogen stream 42 also may be described as hydrogen-rich stream 42 and/or as product hydrogen stream 42.

As shown in FIG. 1, hydrogen purifiers 38 include a hydrogen-separation membrane module 44 that includes at least one hydrogen-selective membrane 46 that is configured to separate mixed gas stream 36 into purified hydrogen stream 42 and byproduct stream 40. Hydrogen-separation membrane module 44 additionally or alternatively may be referred to herein as membrane module 44.

Hydrogen-selective membrane(s) 46 partition, compartmentalize, or separate membrane module 44 into a mixed gas region 86 and a permeate region 88. Hydrogen-selective membranes 46 are hydrogen permeable, which means that hydrogen gas may permeate through the membranes during operative use of hydrogen purifier 38. Hydrogen-selective membranes 46 are configured to permit hydrogen gas to diffuse from mixed gas region 86 to permeate region 88 while confining the other gasses contained in mixed gas stream 36 to mixed gas region 86. Stated differently, during operation of hydrogen purifiers 38, the other gasses may be at least substantially, or completely, fluidly isolated from permeate region 88, while hydrogen-selective membrane(s) 46 allow hydrogen gas to diffuse from mixed gas region 86 to permeate region 88. In other words, membrane module 44 may be described as being configured to separate mixed gas stream 36 into purified hydrogen stream 42 and byproduct stream 40 by selectively permitting hydrogen gas contained within mixed gas stream 36 to diffuse through hydrogen-selective membranes 46 from mixed gas region 86 to permeate region 88. Accordingly, byproduct stream 40 may be described as the portion of mixed gas stream 36 that does not permeate through hydrogen-selective membrane(s) 46, and purified hydrogen stream 42 may be described as the portion of mixed gas stream 36 that permeates through hydrogen-selective membranes 46. With this in mind, hydrogen-selective membranes 46 also may be referred to herein as hydrogen-permeable membranes 46, as hydrogen-permeable metal membranes 46, and/or hydrogen-separation membranes 46.

As schematically indicated in FIG. 1, membrane module 44 may include a plurality of hydrogen-selective membranes 46. As discussed in more detail herein, hydrogen-selective membranes 46 may be arranged in membrane module 44 as pairs 202 of hydrogen-selective membranes 46. Each hydrogen-selective membrane 46 is included in a membrane cell 200, and membrane module 44 may include at least one and/or a plurality of membrane cells 200. Each membrane cell 200 includes at least one hydrogen-selective membrane 46, and optionally a pair 202 of hydrogen-selective membranes 46. Each membrane cell 200 further includes a membrane support assembly 220 that supports hydrogen-selective membrane 46, and optionally a pair 202 of hydrogen-selective membranes 46. Membrane module 44 also may include at least one feed assembly 210 that is configured to supply, or deliver, mixed gas stream 36 to the hydrogen-selective membrane(s) of membrane cells 200. A portion of membrane support assembly 220 may form a fluid seal with at least one peripheral region of hydrogen-selective membrane 46, such that membrane support assembly 220 and hydrogen-selective membrane 46 form a hydrogen-permeable fluid seal between mixed gas region 86 and permeate region 88.

Hydrogen-selective membrane(s) 46 are formed from any suitable material that enables diffusion of hydrogen gas therethrough, while restricting the diffusion of the other materials and/or gasses contained within mixed gas stream 36. Examples of hydrogen-selective membranes 46 according to the present disclosure include membranes of at least one of a metal, a noble metal, a metal alloy, a binary alloy, a ternary alloy, palladium, a palladium alloy, a palladium-copper (Pd—Cu) alloy, a palladium-yttrium alloy, and a palladium-ruthenium alloy, as well as other metallic membranes constructed of substantially pure or alloyed metals. Examples of suitable hydrogen-selective membrane compositions containing a Pd—Cu alloy include Pd—Cu alloys having a copper composition of at least one of at least 15 wt %, at least 20 wt %, at least 25 wt %, at least 30 wt %, at least 35 wt %, at least 40 wt %, at least 45 wt %, at least 50 wt %, and/or at most 60 wt %, at most 55 wt %, at most 53 wt %, at most 50 wt %, at most 45 wt %, at most 40 wt %, at most 35 wt %, at most 30 wt %, and at most 25 wt %. As more examples, the Pd—Cu alloy may include at least one of 15-45 wt % copper, including alloys with 15-25 wt % copper, 35-45 wt % copper, 20 wt % (or approximately 20 wt %) copper, or 40 wt % (or approximately 40 wt %) copper. Examples of suitable hydrogen-selective membranes and membrane compositions are disclosed in U.S. Pat. Nos. 6,537,352 and 10,476,093 and in U.S. Patent Application Publication No. 2008/0210088, the complete disclosures of which are hereby incorporated by reference.

Generally speaking, membrane module 44 separates mixed gas stream 36 in a pressure-driven process, in which mixed gas stream 36 is supplied to mixed gas region 86 at an elevated pressure to facilitate diffusion of hydrogen gas through hydrogen-selective membrane(s) 46. For example, membrane module 44 may be configured to be operated with mixed gas stream 36 being supplied at pressures of at least 50 psi (pounds per square inch), at least 100 psi, at least 125 psi, at least 150 psi, at least 175 psi, at least 200 psi, at most 150 psi, at most 175 psi, at most 250 psi, at most 300 psi, at most 500 psi, and/or at most 1000 psi. Membrane module 44 also may be configured to operate at ambient or at elevated temperatures. As examples, membrane module 44 may be configured to operate at a temperature of at least 100° C., including temperatures of greater than 175° C., 200° C., 250° C., 275° C., 300° C., 350° C., 400° C., and 450° C., as well as temperatures in the range of 100-500° C., including temperatures in the range of 100-450° C., 150-425° C., 200-400° C., 225-350° C., 275-450° C., 100-275° C., 140-240° C., 350-450° C., and 300-500° C., though temperatures outside of these ranges are also within the scope of the present disclosure. As a specific example, for hydrogen-selective membranes 46 containing an alloy of palladium and approximately 35-45% copper, suitable hydrogen-separation temperatures may include temperatures in the range of 300-450° C.

Membrane module 44 may include a mixed gas inlet 82 that is in fluid communication with mixed gas region 86 and is configured to receive mixed gas stream 36, a byproduct outlet 84 that is in fluid communication with mixed gas region 86 and configured to remove byproduct stream 40 from mixed gas region 86, and a purified hydrogen outlet 85 that is in fluid communication with permeate region 88 and configured to remove purified hydrogen stream 42 from permeate region 88.

Hydrogen purifiers 38 may be configured to receive mixed gas stream 36 from any suitable source and purified hydrogen stream 42 produced by hydrogen purifiers 38 may be utilized for any suitable purpose. As shown in FIG. 1, hydrogen purifiers 38 may be included in and/or utilized with a fuel processor 12 that is configured to produce hydrogen gas from a feed stream 16 that includes at least one feedstock 18. In particular, fuel processor 12 includes a hydrogen-producing region 32 that is configured to receive feed stream 16 and produce from feed stream 16 mixed gas stream 36 that includes hydrogen gas. Hydrogen-producing region 32 may generate hydrogen gas from feed stream 16 through any number of suitable hydrogen-producing mechanisms. Examples of suitable hydrogen-producing mechanisms include steam reforming, and autothermal reforming, in which reforming catalysts are utilized in hydrogen-producing region 32 to produce hydrogen gas from feed stream 16 that includes a carbon-containing feedstock and water 20. In this configuration, feedstock 18 may be referred to herein as, or may be, a carbon-containing feedstock 18. Examples of suitable carbon-containing feedstocks include at least one hydrocarbon or alcohol. Examples of suitable hydrocarbons include methane, propane, natural gas, diesel, kerosene, gasoline, and the like. Examples of suitable alcohols include methanol, ethanol, and polyols, such as ethylene glycol, and/or propylene glycol. Other suitable mechanisms for producing hydrogen gas include pyrolysis and catalytic partial oxidation of carbon-containing feedstock 18, in which case the feed stream 16 does not include water but may include oxygen. When the mixed gas stream that is received by hydrogen purifiers 38 is produced by hydrogen-producing region 32, mixed gas stream 36 also may include unreacted carbon-containing feedstock, which may be separated into byproduct stream 40 by hydrogen purifier 38.

When hydrogen-producing region 32 produces hydrogen through a reforming process, hydrogen-producing region 32 may be referred to as a reforming region 32 and may include a reforming catalyst 34. In particular, fuel processor 12 may be referred to as a steam reformer 30 when hydrogen-producing region 32 produces hydrogen through a steam reforming process and includes a steam reforming catalyst. Alternatively, fuel processor 12 may be referred to as an autothermal reformer when hydrogen-producing region 32 produces hydrogen through an autothermal reforming process and includes an autothermal reforming catalyst. In both examples, reforming region 32 generates from a feed stream 16 that includes water and a carbon-containing feedstock 18, a mixed gas stream 36 that includes hydrogen and one or more other gasses. When mixed gas stream 36 is produced by reforming region 32 and/or via a reforming process, mixed gas stream 36 may be referred to as a reformate stream 36. Stated differently, hydrogen purifiers 38 may be described as being configured to separate reformate stream 36 into purified hydrogen stream 42 and byproduct stream 40 when included in or utilized with a fuel processing system. When included in or utilized with a fuel processor 12, hydrogen purifier 38 may be referred to as a purification region 38, a separation region 38, and/or a separation assembly 38.

As shown in FIG. 1, byproduct stream 40 may be supplied to a heating assembly 91 that may include a burner assembly 92, which includes one or more burners, and burner assembly 92 may combust or otherwise utilize byproduct stream 40 to generate heat. Heating assembly 91 may be configured to heat at least a portion of fuel processor 12, such as hydrogen-producing region 32, hydrogen purifier 38, and/or membrane module 44. For example, heating assembly 91 may be configured to heat the portion of the fuel processing system to a suitable operating temperature, or operating temperature range, for producing hydrogen gas, purifying hydrogen gas, etc. Heating assembly 91 also may be configured to heat various streams within fuel processor 12. As an example, heating assembly 91 may include a vaporization region, or a vaporizer, that is configured to vaporize any liquid portion of feed stream 16, such that feed streams 16 may be in a vaporized state when, upon, or prior to entering hydrogen-producing region 32.

Fuel processor 12 also may include a heated containment structure 94 that defines an internal compartment which may contain hydrogen purifier 38, membrane module 44, hydrogen-producing region 32, and/or at least a portion of a feed stream delivery system 17, as well as any suitable valves, conduits, and/or piping associated with the above components. Any components contained within heated containment structure 94 may be maintained at substantially the same temperature, or may be maintained at different temperatures. It also is within the scope of the present disclosure that heated containment structure 94 may include insulation that may decrease the rate of heat transfer between the internal compartment of heated containment structure 94 and the environment and/or control the flow of heat among the components contained within the internal compartment.

Hydrogen purifiers 38 are not limited to use in fuel processors 12 and may be utilized to purify hydrogen gas outside of fuel processor 12 without departing from the scope of the present disclosure. As examples, hydrogen purifiers may be configured to purify a mixed gas stream from a stored gas containing hydrogen gas and mixed gas or an impure hydrogen gas stream from an industrial or commercial process.

Hydrogen purifiers 38 also may include various additional components other than membrane module 44, such as components that feed mixed gas stream 36 to membrane module 44 and/or components that remove purified hydrogen stream 42 from membrane module 44. For example, and as shown in FIG. 1, hydrogen purifiers 38 optionally may include or be in fluid communication with a polishing region 45 that receives purified hydrogen stream 42 from membrane module 44 and is configured to further purify purified hydrogen stream 42, such as by removing, reducing the concentration of, and/or chemically reacting with selected impurities that may be present within purified hydrogen stream 42. Examples of components that may be utilized within polishing region 45 include water-shift reactors, methanation catalysts that convert carbon monoxide and hydrogen to methane and water, and/or other components, structures, and/or compositions that convert carbon monoxide to carbon dioxide or otherwise sorb or remove carbon monoxide from the purified hydrogen stream. For example, when purified hydrogen stream 42 is intended for use in a fuel cell stack 22 that includes a proton exchange membrane (PEM) or another device that will be damaged if purified hydrogen stream 42 includes more than determined concentrations of carbon monoxide or carbon dioxide, polishing region 45 may include at least one methanation catalyst bed.

Figure 2:
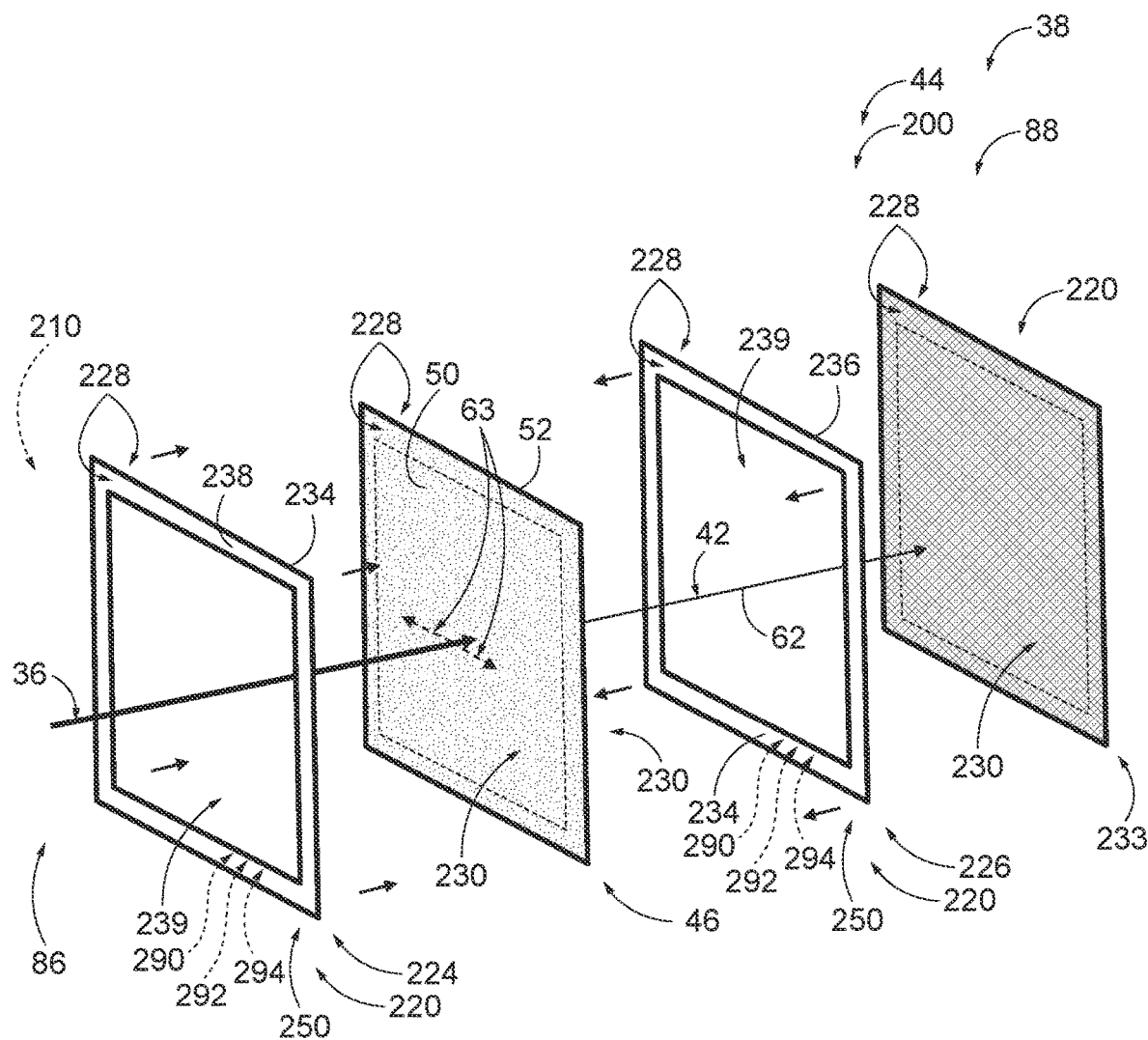
FIG. 2 is an isometric exploded view illustrating examples of a membrane cell of a hydrogen purifier according to the present disclosure.

Turning now to FIG. 2, illustrated therein is an exploded view illustrating examples of a membrane cell 200 that forms a portion of membrane module 44, according to the present disclosure. Membrane cell 200 additionally or alternatively may be referred to herein as membrane pack 200 and/or membrane envelope 200. As shown, membrane cell 200 comprises hydrogen-selective membrane 46, which defines a permeate face 52 and a mixed gas face 50. Mixed gas face 50 is positioned within or faces mixed gas region 86 of membrane module 44. Permeate face 52 is positioned within or faces permeate region 88 of membrane module 44. Mixed gas face 50 also may be referred to herein as a mixed gas-facing region 50, as a reformate face 50, and/or as a reformate-facing region 50, and permeate face 52 also may be referred to herein as a permeate-facing region 52, product hydrogen-facing region 52 and/or purified hydrogen-facing region 52. Hydrogen-selective membrane 46 may be constructed to possess any suitable thickness, which may be measured between mixed gas face 50 and permeate face 52. In particular, a diffusion rate of hydrogen through the hydrogen-selective membrane(s) and/or the hydrogen permeability of hydrogen-selective membrane(s) 46 may be proportional to a thickness of, or a distance that the hydrogen must diffuse through, the hydrogen-selective membrane. As such, a thinner hydrogen-selective membrane 46 may have greater hydrogen permeability than an otherwise identical thicker hydrogen-selective membrane when utilized under the same operating conditions. Accordingly, hydrogen purifiers 38 according to the present disclosure may utilize hydrogen-selective membranes 46 that are very thin, such as with a thickness of 15-25 microns. As examples, each hydrogen-selective membrane 46 of membrane cell 200, membrane module 44, and/or hydrogen purifier 38 according to the present disclosure may possess a membrane thickness of at most 25 microns, at most 20 microns, at most 15 microns, at most 10 microns, at most 5 microns, at least 1 micron, at least 2 microns, at least 4 microns, at least 6 microns, at least 8 microns, at least 10 microns, and at least 12 microns.

As discussed herein, membrane module 44 receives mixed gas stream 36 within mixed gas region 86 and hydrogen-selective membrane 46 permits at least a portion of hydrogen gas 62 contained within mixed gas stream 36 to diffuse to permeate region 88, while confining the other gasses 63 present in mixed gas stream 36 to mixed gas region 86. The hydrogen gas 62 that diffuses through hydrogen-selective membrane 46 is removed from membrane module 44 as purified hydrogen stream 42.

As shown in FIG. 2, membrane cell 200 also includes a fluid-permeable support structure 233 that physically contacts and supports at least a central region 230 of permeate face 52. More specifically, during operation of membrane module 44, mixed gas stream 36 may be supplied to mixed gas region 86 at a higher pressure than the pressure of purified hydrogen stream 42 within permeate region 88, and fluid-permeable support structure 233 may support at least central region 230 of hydrogen-selective membrane 46 against the pressure differential between mixed gas region 86 and permeate region 88. Fluid-permeable support structure 233 may include any suitable fluid-permeable or porous material, or a combination of one or more porous materials, that are configured to support hydrogen-selective membrane 46 and permit fluid to flow from permeate face 52 of hydrogen-selective membrane 46. As examples, fluid-permeable support structure 233 may include one or more of a screen structure, one or more mesh screens, one or more fine mesh screens, one or more coarse mesh screens, one or more expanded metal screens, one or more porous ceramic members, filter cloth, and/or combinations thereof. As shown in FIG. 2, fluid-permeable support structure 233 may be positioned within, or may define, a portion of permeate region 88. Fluid-permeable support structure 233 also may be referred to herein as support structure 233.

Membrane cell 200 also includes a permeate-side frame member 226 that is interposed between hydrogen-selective membrane 46 and fluid-permeable support structure 233 and physically contacts a peripheral region 228 of hydrogen-selective membrane 46 and a peripheral region 228 of fluid-permeable support structure 233. Permeate-side frame member 226 supports peripheral region 228 of hydrogen-selective membrane 46 and also may be configured to form a fluid seal with peripheral region 228 of permeate face 52. Permeate-side frame member 226 includes a central region 239 that may be an open central region and/or a fluid-permeable central region, such that permeate-side frame member 226 may permit hydrogen gas 62 to flow from permeate face 52 of hydrogen-selective membrane 46 to permeate region 88. Stated differently, permeate-side frame member 226 may be described as having a peripheral region 228 that physically contacts fluid-permeable support structure 233 and hydrogen-selective membrane 46 and/or may be described as being a gasket and/or as having a gasket shape.

Membrane cell 200 further includes a mixed gas-side frame member 224 that physically contacts a peripheral region 228 of mixed gas face 50 of hydrogen-selective membrane 46. Mixed gas-side frame member 224 is configured to form a fluid seal with peripheral region 228 of mixed gas face 50 and a peripheral region of a feed assembly 210 that supplies mixed gas stream 36 to mixed gas face 50. Mixed gas-side frame member 225 also may be configured to support peripheral region 228 of mixed gas face 50 of hydrogen-selective membrane 50. Mixed gas-side frame member 224 also includes a central region 239 that may be an open and/or fluid-permeable central region, such that mixed gas-side frame member 224 permits mixed gas stream 36 to contact at least the central region 230 of hydrogen-selective membrane 46. Stated differently, mixed gas-side frame member 224 may be described as having a peripheral region 228 that physically contacts and supports hydrogen-selective membrane 46 and/or may be described as being a gasket and/or having a gasket shape. As shown in FIG. 2, mixed gas-side frame member 224, permeate-side frame member 226, and fluid-permeable support structure 233 may be described as defining, and/or being included in, membrane support assembly 220.

With continued reference to FIG. 2, at least one of permeate-side frame member 226 and mixed gas-side frame member 224 is a graphite frame member 250. More specifically, mixed gas-side frame member 224 may be a graphite frame member 250, permeate-side frame member 226 may be a graphite frame member, or both mixed gas-side frame member 224 and permeate-side frame member 226 may be graphite frame members 250. Mixed gas-side frame member 224, permeate-side frame member 226, and graphite frame member 250 may be referred to as frame members. Graphite frame member 250 comprises and/or is formed from graphite. In particular, graphite frame member 250 may include and/or may be formed from a high-purity graphite. As an example, graphite frame member 250 may include at least 99 wt % carbon. As more examples, graphite frame member 250 may include at least one of at least 99.1 wt % carbon, 99.2 wt % carbon, 99.3 wt % carbon, 99.4 wt % carbon, 99.5 wt % carbon, at least 99.6 wt % carbon, at least 99.7 wt % carbon, at least 99.8 wt % carbon, and at least 99.9 wt % carbon. Additionally or alternatively, graphite frame member 250 may include at most 99.999 wt % carbon.

Stated another way, graphite frame member 250 may include a low and/or reduced quantity, concentration, and/or presence of impurities and/or components other than graphite. More specifically, graphite frame member 250 may include a low, reduced, and/or non-detrimental amount, concentration, and/or presence of impurities that may impede, damage, arrest, and/or hinder operation of hydrogen-selective membrane 46 and/or membrane module 44 during operative use of hydrogen purifier 38. As mentioned, permeate-side frame member 226 and/or mixed gas-side frame member 224 may form a fluid seal with peripheral region 228 of hydrogen-selective membrane 46, such as to fluidly isolate permeate region 88 from the other gasses 63 of mixed gas stream 36. With this in mind, graphite frame member 250 may include a low, reduced, and/or non-detrimental quantity or concentration of any components or impurities that may damage, impede, and/or compromise the fluid seal formed with hydrogen-selective membrane 46.

As a more specific example, mixed gas-side frame member 224, permeate-side frame member 226, and/or graphite frame member 250 may include a non-zero quantity of a granular particulate 290, such as at least 0.001 wt % granular particulate. Granular particulate 290 may include particles or granules of a substance that may cause surface roughness in the respective frame member, that may compromise the fluid seal formed between the frame member and hydrogen-selective membrane 46, and/or may form perforations in hydrogen-selective membrane 46. As examples, granular particulate 290 may include particles of ash, MgO, $Al_2O_3$, CaO, $Fe_2O_3$, and/or a material that may possess a greater hardness than hydrogen-selective membrane 46 and/or that may be sufficiently hard that the particulate may pierce or perforate hydrogen-selective membrane 46. With this in mind, graphite frame member 250 may be formed, constructed, and/or configured to include a low, reduced, or non-detrimental amount, concentration, or quantity of granular particulate 290. Stated differently, graphite frame member 250 may include less than a threshold maximum quantity of granular particulate 290 that is non-damaging or non-compromising to the operation of hydrogen-selective membrane 46 and/or membrane module 44, and/or that does not cause detrimental surface roughening in graphite frame member 250 and/or compromise the fluid seal formed with hydrogen-selective membrane 46. As examples, graphite frame member 250 may include at most 1 wt % granular particulate, at most 0.9 wt % granular particulate, at most 0.8 wt % granular particulate, at most 0.7 wt % granular particulate, at most 0.6 wt % granular particulate, at most 0.5 wt % granular particulate, at most 0.4 wt % granular particulate, at most 0.3 wt % granular particulate, at most 0.2 wt % granular particulate, at most 0.1 wt % granular particulate, or at most 0.01 wt % granular particulate.

Additionally or alternatively, graphite frame member 250 may be formed, constructed, and/or configured to include a type, form, and/or size of granular particulate 290 that may be non-damaging, non-detrimental, and/or non-compromising to the operation of hydrogen-selective membrane 46, membrane module 44, and/or the fluid seal formed with hydrogen-selective membrane 46. For example, granular particulate 290 that includes large or coarse particles may cause surface roughness in the respective frame member, may be compromising to the fluid seal formed with hydrogen-selective membrane 46, and/or may form perforations in the hydrogen-selective membrane 46. By contrast, granular particulate 290 that consists of fine granular particulate 292, which consists of small or fine granular particles and/or does not include coarse or large particles, may not cause surface roughness in the respective frame member, may not be compromising to the fluid seal formed with hydrogen-selective membrane 46, and/or may not form perforations in the hydrogen-selective membrane 46. With this in mind, graphite frame member 250 may only include fine granular particulate 292 and/or may be at least substantially free from coarse or large granular particulate. In particular, fine granular particulate 292 may consist of granular particles having a maximum dimension that is at most 400 micrometers, while coarse granular particulate may consist of granular particles having a maximum dimension that is at least 400 micrometers. As more examples, fine granular particulate 292 may consist of granular particles having a maximum dimension that is at least one of at most 400 micrometers, at most 300 micrometers, at most 200 micrometers, at most 150 micrometers, at most 100 micrometers, at most 80 micrometers, at most 60 micrometers, at most 40 micrometers, at most 20 micrometers, at most 10 micrometers, at most 5 micrometers, at most 1 micrometer, at most 0.5 micrometers, at most 0.2 micrometers, and/or at least 0.1 micrometers.

As shown in FIG. 2, graphite frame member 250 includes at least one membrane-contacting face 234 that physically contacts and supports hydrogen-selective membrane 46. At least membrane-contacting face 234 of graphite frame member 250 may be a smooth surface and/or may be configured to form a seal with hydrogen-selective membrane 46. Such a seal additionally or alternatively may be referred to herein as a fluid seal, a perforation-free seal, and/or a perforation-free fluid seal.

With continued reference to FIG. 2, mixed gas-side frame member 224, permeate-side frame member 226, and/or graphite frame member 250 also may include one or more chemical impurities 294. When present in a sufficiently large amount, quantity, or concentration within a frame member, chemical impurities 294 may impede, damage, arrest, and/or hinder operation of hydrogen-selective membrane 46 and/or of membrane module 44, such as during operative use of hydrogen purifier 38. Accordingly, hydrogen purifiers 38 according to the present disclosure may include mixed gas-side frame members 224, permeate-side frame members 226, and/or graphite frame members 250 that are formed, constructed, and/or configured to possess less than such a threshold amount of such chemical impurities 294.

As a more specific example, chemical impurities 294 may include sulfur, sulfur compounds, and/or sulfur ions that may be interspersed, embedded, and/or sorbed to or within mixed gas-side frame member 224, permeate-side frame member 226, and graphite frame member 250. As used herein, the term "sorb" means binding and/or retaining the composition, contaminant, or other species by any process, including at least adsorption, absorption, chemical bonding, or a combination thereof. When sulfur is present at a sufficiently large amount, quantity, or concentration within a frame member, the sulfur may be transferred from the frame member, such as via evolution during operation of the membrane module 44 at elevated temperatures, and sorb to hydrogen-selective membrane 46. Sorption of sulfur to hydrogen-selective membrane 46 may poison, and/or reduce the hydrogen permeance of hydrogen-selective membrane 46. With this in mind, graphite frame member 250 may include a low, reduced, or non-detrimental amount, concentration, or quantity of sulfur. Stated differently, graphite frame member 250 may include less than a threshold concentration, or quantity, of sulfur that is non-detrimental, or non-impeding to hydrogen-selective membrane 46, such as during operation of membrane module 44 at any of the pressures and/or temperatures that are discussed herein. As examples, graphite frame member 250 may include at least one of at most 450 parts per million (ppm) sulfur, at most 400 ppm sulfur, at most 350 ppm sulfur, at most 300 ppm sulfur, at most 250 ppm sulfur, at most 200 ppm sulfur, at most 100 ppm sulfur, at most 50 ppm sulfur, and at most 20 ppm sulfur. Graphite frame member 250 may include a small, non-detrimental, or non-interacting concentration of sulfur such as at least 0.5 ppm sulfur or at least 1 ppm sulfur.

Another example of a chemical impurity 294 that may be present in mixed gas-side frame member 224, permeate-side frame member 226, and graphite frame member 250 is a halide. More specific examples of halides include bromides, chlorides, and/or compounds thereof. When present in a frame member in a sufficiently high quantity, amount, or concertation, halides may transfer from the frame member, such as during operation of the membrane module 44 at elevated temperatures, and sorb to hydrogen-selective membrane 46. Sorption of halides to hydrogen-selective membrane 46 may poison, and/or reduce the hydrogen permeance of hydrogen-selective membrane 46. With this in mind, graphite frame member 250 may include a low, reduced, or non-detrimental amount, concentration, or quantity of one or more halides and/or of a total concentration of halides. Stated differently, graphite frame member 250 may include less than a threshold concentration, or quantity, of one or more halides that is non-detrimental, or non-impeding to hydrogen-selective membrane 46, such as during operation of membrane module 44 at any of the pressures and/or temperatures that are discussed herein. As examples, graphite frame member 250 may include at least one of at most 100 ppm halide, at most 80 ppm halide, at most 60 ppm halide, at most 40 ppm halide, at most 20 ppm halide, at most 10 ppm halide, and at most 1 ppm halide. Graphite frame member 250 may include a small, non-detrimental, or non-interacting concentration of halides, such as at least 0.05 ppm halide or at least 0.2 ppm halide.

Graphite frame members 250 according to the present disclosure may be configured to support and/or form seals, such perforation-free seals, with hydrogen-selective membrane 46 and/or feed assembly 210 under any suitable applied pressure. More specifically, a compressive force may be applied to peripheral region 228 of feed assembly(s) 210 and/or peripheral region 228 of membrane support assembly 220, such as to form the plurality of fluid seals of inner membrane shell 222. In particular, mixed gas-side frame member 224, permeate-side frame member 226, and/or graphite frame member 250 may be compressed against hydrogen-selective membrane 46 with a pressure of at least one of at least 2000 pounds per square inch (Psi) (13.8 MPa (Mega Pascal)), at least 2900 psi (20 MPa), at least 3000 psi (20.7 MPa), at least 3200 psi (22.1 MPa), at least 3400 psi (23.4 MPa), at least 3600 psi (24.8 MPa), and/or at most 3100 psi (21.4 MPa), at most 3200 psi (22.1 MPa), at most 3600 psi (24.8 MPa), at most 3700 psi (25.5 MPa), at most 3800 psi (26.2 MPa), and at most 4000 psi (27.6 MPa). As discussed herein, either of both faces of graphite frame member 250 may be smooth surfaces that permit graphite frame member 250 to support and/or form a fluid seal, such as a perforation free fluid seal, with hydrogen-selective membrane 46 and/or feed assembly 210 under any of these applied pressures.

Graphite frame member 250, mixed gas side-frame member 224, and permeate-side frame member 226 each may possess any suitable density. As examples, graphite frame member 250 may possess a graphite frame member density that is at least one of at least 0.7 grams per cubic centimeter (g/cc), at least 0.8 g/cc, at least 0.9 g/cc, at least 1 g/cc, at least 1.1 g/cc, at least 1.2 g/cc, at least 1.3 g/cc, at least 1.4 g/cc, at least 1.5 g/cc, at most 1.8 g/cc, at most 1.7 g/cc, at most 1.6 g/cc, at most 1.5 g/cc, at most 1.4 g/cc, at most 1.3 g/cc, at most 1.2 g/cc, at most 1.1 g/cc, and at most 1 g/cc.

Mixed gas-side frame member 224 and permeate-side frame member 226 may possess the same or different densities. In some examples, mixed gas-side frame member 224 and permeate-side frame member 226 may possess different densities. More specifically, in some hydrogen purifiers 38, the density of mixed gas-side frame member 224 may be less than the density of permeate-side frame member 226, as this may facilitate assembly of membrane cell 200 and/or may permit compression of membrane cell(s) 200 in a manner that does not damage hydrogen-selective membrane(s) 46.

With this in mind, permeate-side frame member 226 may have a permeate-side frame member density that is greater than a mixed gas-side frame member density of mixed gas-side frame member 224. As examples, permeate-side frame member 226 of hydrogen purifiers 38 according to the present disclosure may include a permeate-side frame member density of at least one of at least 0.7 grams per cubic centimeter (g/cc), at least 0.8 g/cc, at least 0.9 g/cc, at least 1.0 g/cc, at least 1.1 g/cc, at least 1.2 g/cc, at least 1.3 g/cc, at least 1.4 g/cc, at least 1.5 g/cc, at most 1.8 g/cc, at most 1.7 g/cc, at most 1.6 g/cc, at most 1.5 g/cc, and at most 1.4 g/cc. As more examples, mixed gas-side frame member 224 may include a mixed gas-side frame member density that is at least one of at least 0.7 g/cc, at least 0.8 g/cc, at least 0.9 g/cc, at least 1 g/cc, at least 1.1 g/cc, at least 1.2 g/cc, at most 1.4 g/cc, at most 1.3 g/cc, at most 1.2 g/cc, at most 1.1 g/cc, and at most 1 g/cc. As a more specific example, the mixed gas-side frame member density may be a threshold fraction of the permeate-side frame member density, with examples of the threshold fraction including 95%, 90%, 85%, 80%, 78%, 75%, 70%, or 65%. Thus, when mixed gas-side frame member 224 and permeate-side frame member 226 are graphite frame members 250, each graphite frame member 250 may be configured to possess a different density.

It also is within the scope of the present disclosure that mixed gas-side frame member 224 and permeate-side frame member 226 of hydrogen purifiers 38 according to the present disclosure may possess any suitable thicknesses. Examples of the thickness of permeate-side frame member 226 include thicknesses of at least 0.05 millimeters (mm), at least 0.075 mm, at least 0.1 mm, at least 0.125 mm, at most 0.25 mm, at most 0.20 mm, at most 0.175 mm, at most 0.15 mm, and/or at most 0.125 mm. Examples of the thickness of mixed gas-side frame member 224 include thicknesses of at least 0.15 millimeters (mm), at least 0.2 mm, at least 0.25 mm, at least 0.3 mm, at most 0.6 mm, at most 0.5 mm, at most 0.45 mm, at most 0.4 mm, and/or at most 0.35 mm. Permeate-side frame member 226 and mixed gas-side frame member 224 may possess the same or different thicknesses. In some examples, the thickness of permeate-side frame member 226 may differ from the thickness of the corresponding mixed gas-side frame member 224. As more specific examples, the thickness of permeate-side frame member 226 may be less than the thickness of the corresponding mixed gas-side frame member 224. This difference in thickness may decrease stress on and/or deformation of hydrogen-selective membrane 46.

The thickness of permeate-side frame member 226 may differ from the thickness of the mixed gas-side frame member 224 by any suitable amount. As examples, the thickness of the permeate-side frame members may be less than 95%, less than 90%, less than 85%, less than 80%, less than 75%, less than 70%, less than 65%, less than 60%, less than 55%, less than 52%, less than 50%, and/or less than 45% of the thickness of the mixed gas-side frame members.

In view of the above, graphite frame member 250 may be configured to possess any suitable thickness, such as any of the thicknesses discussed herein with reference to mixed gas-side frame member 224 and/or permeate-side frame member 226. As a more specific example, when mixed gas-side frame member 224 and permeate-side frame member 226 are both graphite frame members 250, graphite frame members 250 may include the same or different thicknesses.

Figure 3:
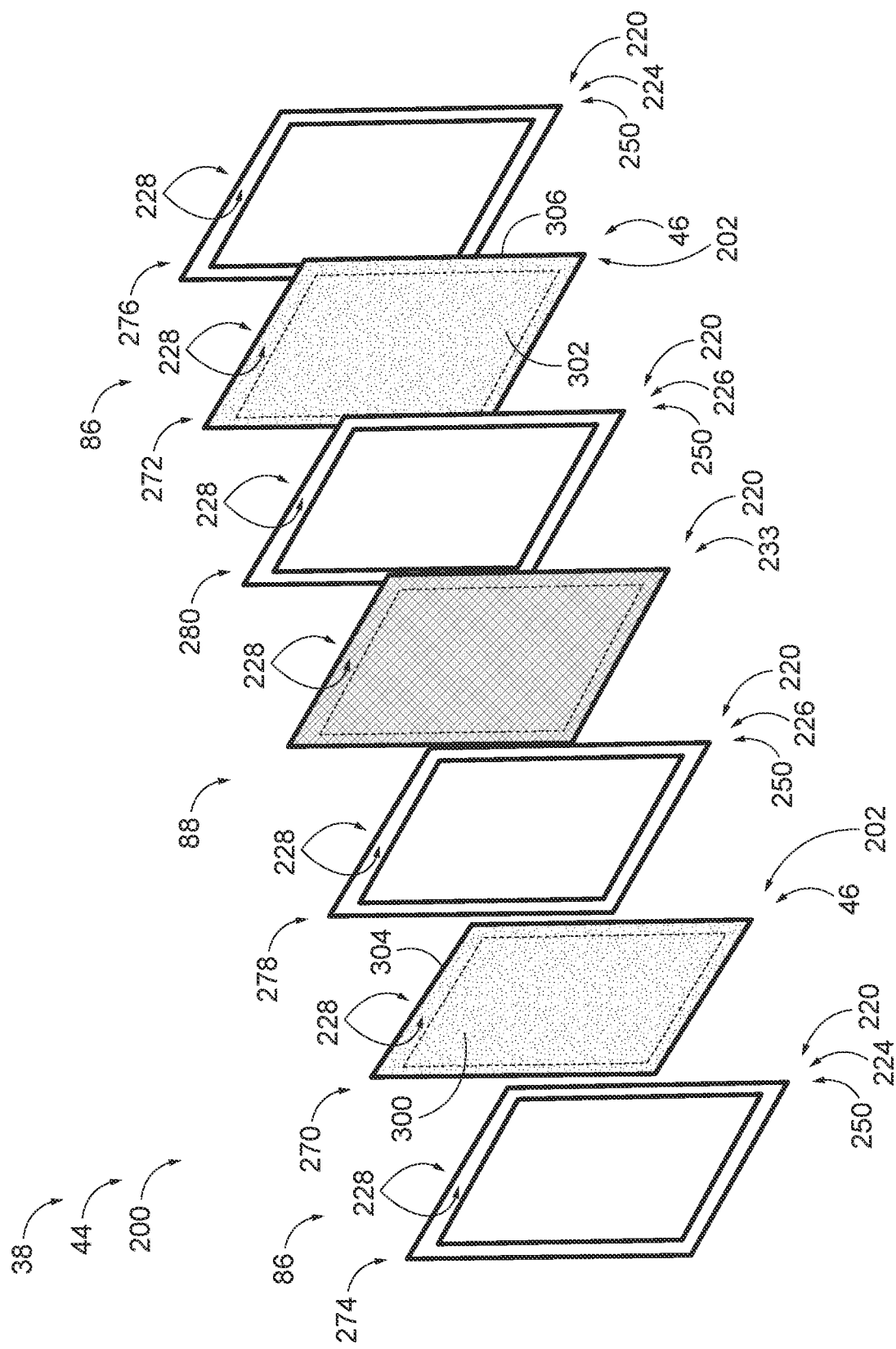
FIG. 3 is an isometric exploded view illustrating examples of a membrane cell that includes a pair of hydrogen-selective membranes according to the present disclosure.

While FIG. 2 illustrates examples in which membrane cell 200 includes a single hydrogen-selective membrane 46, it is within the scope of the present disclosure that membrane cell 200 may include two hydrogen-selective membranes 46 that may be arranged as pair 202 of hydrogen-selective membranes. FIG. 3 is an exploded view illustrating examples of a membrane cell 200 that includes a pair 202 of hydrogen-selective membranes 46. As shown, pair 202 of hydrogen-selective membranes 46 includes a first hydrogen-selective membrane 270, a second hydrogen-selective membrane 272, and a membrane support assembly 220 that supports first hydrogen-selective membrane 270 and second hydrogen-selective membrane 272. First hydrogen-selective membrane 270 defines a first mixed gas face 300 that faces mixed gas region 86 and a first permeate face 304 that faces permeate region 88. Second hydrogen-selective membrane 272 defines a second mixed gas face 306 that faces mixed gas region 86 and a second permeate face 302 that faces permeate region 88.

Membrane support assembly 220 includes fluid-permeable support structure 233 that is positioned between at least central region 230 of first hydrogen-selective membrane 270 and at least central region 230 of second hydrogen-selective membrane 272, such that fluid-permeable support structure 233 physically contacts and supports at least central region 230 of first permeate face 304 and at least the central region 230 of second permeate face 302. In this way, first permeate face 304 of first hydrogen-selective membrane 270 and second permeate face 302 of second hydrogen-selective membrane 272 are commonly supported by fluid-permeable support structure 233, with fluid-permeable support structure 233 supporting central region 230 of first hydrogen-selective membrane 270 spaced apart from, or in a spaced relationship to, central region 230 of second hydrogen-selective membrane 272.

Membrane support assembly 220 further includes a first mixed gas-side frame member 274 and a first permeate-side frame member 278 that support first hydrogen-selective membrane 270, such as discussed herein, and a second mixed gas-side frame member 276 and a second permeate-side frame member 280 that support second hydrogen-selective membrane 272, such as discussed herein. As shown in FIG. 3, one or more of, and optionally each of, first mixed gas-side frame member 274 and first permeate-side frame member 278 are graphite frame members 250 and one or more of, and optionally each of, second mixed gas-side frame member 276 and second permeate-side frame member 280 are graphite frame members 250. As discussed herein, first mixed gas-side frame member 274 and first permeate-side frame member 278 may be referred to herein as corresponding frame members. Likewise, second mixed gas-side frame member 276 and second permeate-side frame member 280 may be referred to herein as corresponding frame members.

Figure 4:
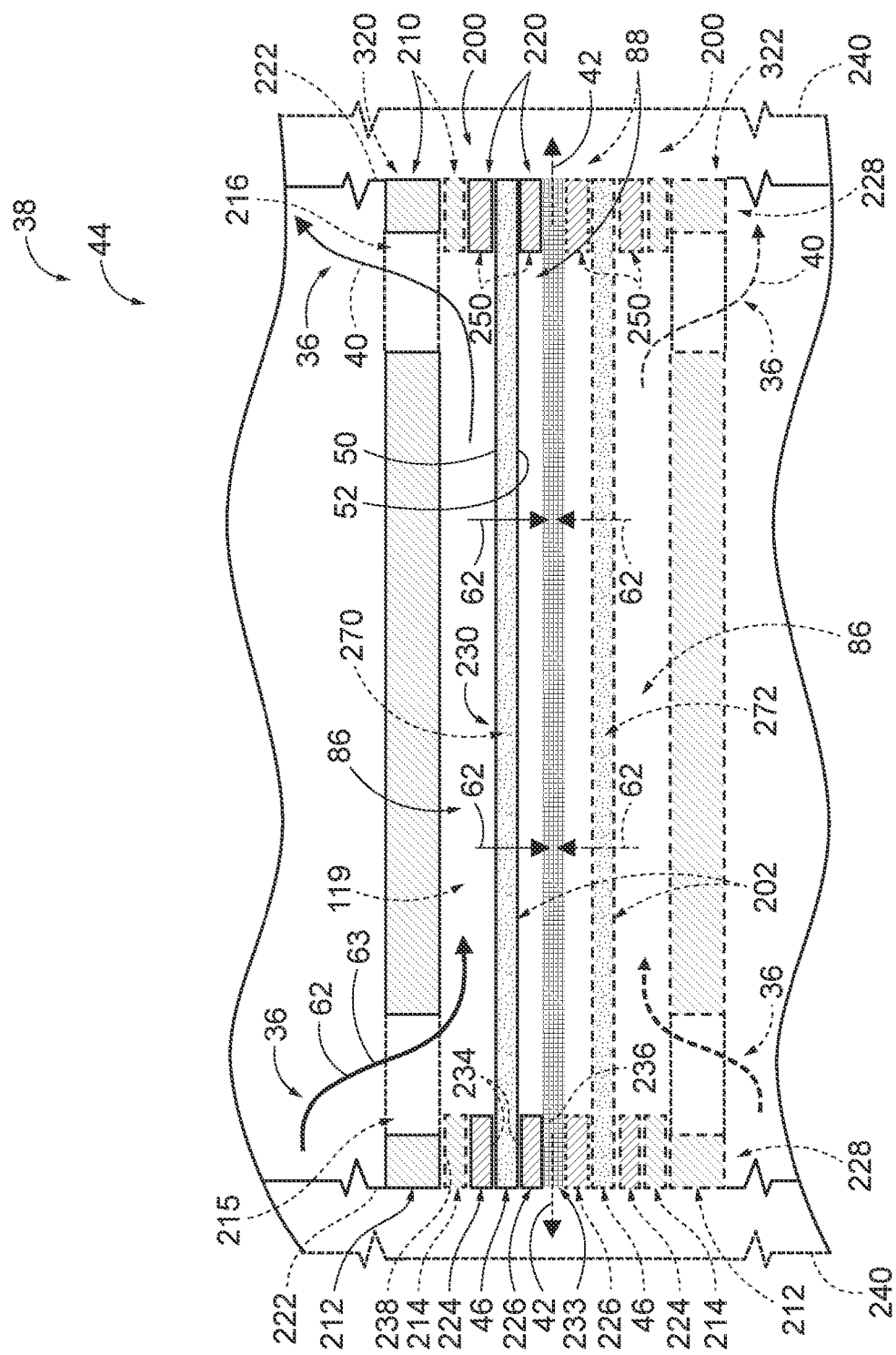
FIG. 4 is a fragmentary schematic representation of examples of a membrane cell positioned within a hydrogen purifier according to the present disclosure.

FIG. 4 is a schematic representation of examples of a portion of a membrane module 44 that includes at least one graphite frame member 250 according to the present disclosure. More specifically, FIG. 4 is a partial cross-sectional schematic view of membrane module 44 showing a single membrane cell 200 and one or more corresponding feed assemblies 210. As shown, membrane module 44 includes membrane cell 200 having at least one hydrogen-selective membrane 46, and optionally a pair 202 of hydrogen-selective membranes 46. As also shown, membrane module 44 includes a membrane support assembly 220 having mixed gas-side frame member 224, permeate-side frame member 226, and fluid-permeable support structure 233 that contact, support and/or form a seal with hydrogen-selective membrane 46, such as discussed herein.

As shown in the example of FIG. 4, membrane modules 44 according to the present disclosure also may include at least one feed assembly 210 associated with membrane cell 200 that may be configured to supply mixed gas stream 36 to mixed gas region 86 and/or to receive byproduct stream 40 and/or mixed gas stream 36 from mixed gas region 86. Examples of feed assembly 210 are schematically illustrated in FIG. 4. As shown, feed assembly 210 may include a feed plate 212, which may include and/or define a supply region 215 that supplies mixed gas stream 36 to mixed gas region 86 and/or an exhaust region 216 that receives mixed gas stream 36 and/or byproduct stream 40 from mixed gas region 86. Feed assembly 210 also may include a feed frame 214 that is positioned between feed plate 212 and membrane cell 200. More specifically, feed frame 214 may be positioned between feed plate 212 and mixed gas-side frame member 224, such that feed frame 214 operatively contacts mixed gas-side frame member 224 and a peripheral region of feed plate 212, and supports feed plate 212 spaced apart from mixed gas-side frame member 224. As shown, feed frame 214 together with mixed gas-side frame member 224 may form an open volume 119 between hydrogen-selective membrane 46 and feed plate 212 to permit flow of mixed gas stream 36 across mixed gas face 50 and/or to permit fluid communication between supply region 215 and exhaust region 216.

With continued reference to FIG. 4, membrane cell 200 is shown including pair 202 of hydrogen-selective membranes 46 that are supported by a common fluid-permeable support structure 233. In particular, fluid-permeable support structure 233 supports at least central regions 230 of pair 202 of hydrogen-selective membranes 46 spaced apart with permeate region 88 being defined therebetween. When membrane cell 200 includes pair 202 of hydrogen-selective membranes 46, membrane module 44 may include a pair of feed assemblies 210 associated with membrane cell 200, in which the pair of feed assemblies 210 includes a first feed assembly 320 that is configured to supply mixed gas stream 36 to a mixed gas face 50 of first hydrogen-selective membrane 270 and a second feed assembly 322 that is configured to supply mixed gas stream 36 to mixed gas face 50 of second hydrogen-selective membrane 272.

As shown in FIG. 4, membrane module 44 may include an inner membrane shell 222 that is configured to fluidly isolate permeate region 88 from mixed gas region 86. Inner membrane shell 222 may be formed by mixed gas-side frame member(s) 224, permeate-side frame member(s) 226, hydrogen-selective membrane(s) 46, and at least a peripheral region 228 of feed assembly(s) 210. More specifically, at least a portion of permeate region 88 may be confined by permeate face(s) 52 of hydrogen selective-membrane(s) 46, while peripheral region 228 of fluid-permeable support structure 233 may permit purified hydrogen stream 42 to pass from within inner membrane shell 222 to outside of inner membrane shell 222, such that at least a portion of permeate region 88 may be defined exterior to inner membrane shell 222. Membrane module 44 also may include an outer membrane shell 240 that may surround inner membrane shell 222 and permeate region 88. In particular, an interior face of outer membrane shell 240 may surround inner membrane shell 222 and permeate region 88. Outer membrane shell 240 and inner membrane shell 222 may be spaced apart from one another such that the inner face of outer membrane shell 240 and an outer face of inner membrane shell 222 may define a conduit for collecting purified hydrogen stream 42.

Inner membrane shell 222 may include a plurality of fluid seals that fluidly isolate mixed gas region 86 from permeate region 88, such as a fluid seal formed between mixed gas-side frame member 224 and feed assembly 210 and/or a fluid seal formed between mixed gas-side frame member 224 and hydrogen-selective membrane 46. With this in mind, mixed gas-side frame member 224 may be graphite frame member 250, such that a perforation-free fluid seal is formed between mixed gas-side frame member 224 and peripheral region 228 of hydrogen-selective membrane(s) 46 and/or between mixed gas-side frame member 224 and feed assembly 210. In such an application, a feed-assembly contacting face 238 of graphite frame member 250 also may be a smooth surface, such as discussed herein for the membrane contacting face, such that graphite frame member 250 may form a perforation-free fluid seal with feed assembly 210.

Figure 5:
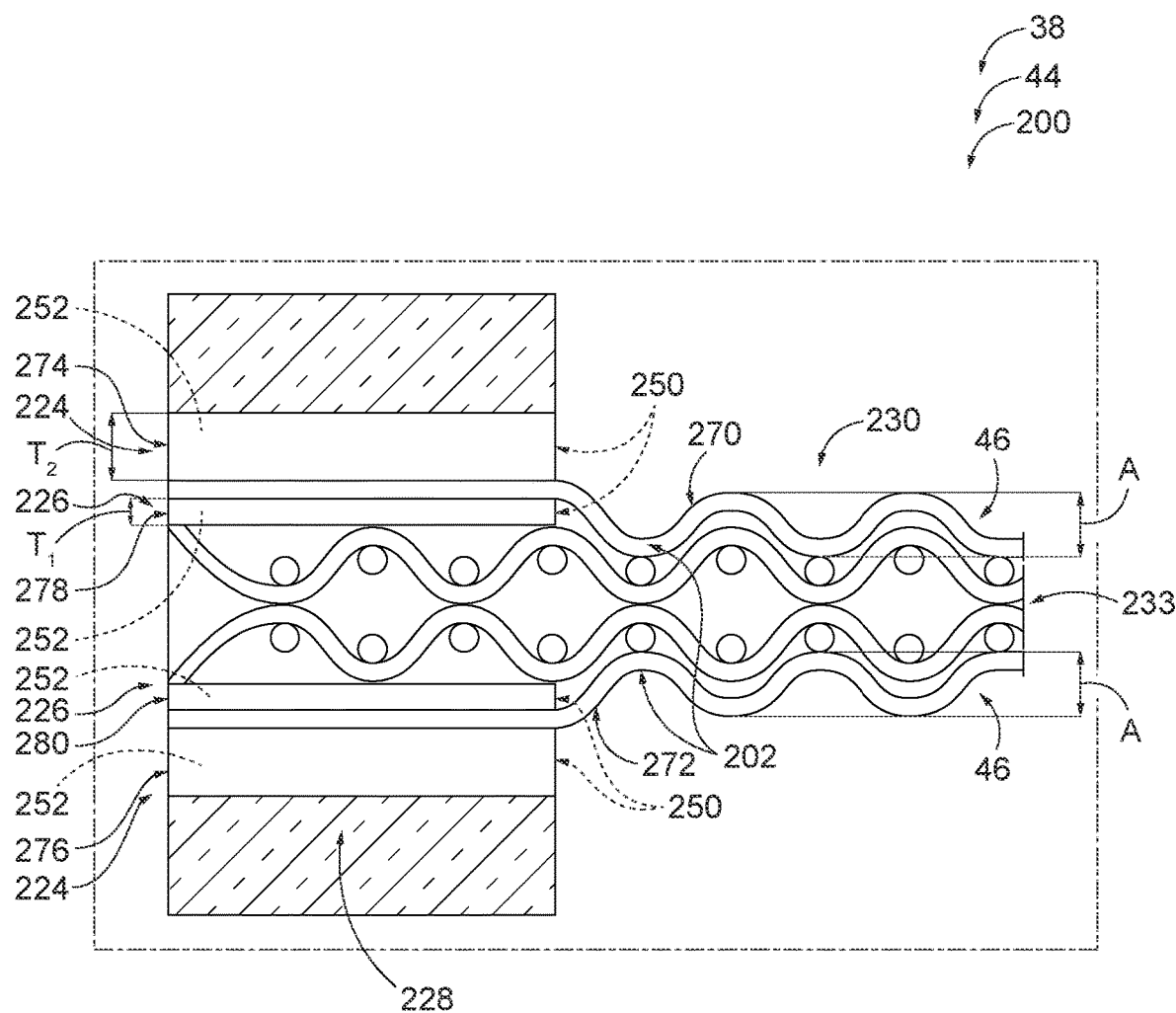
FIG. 5 is a fragmentary cross-sectional view through a schematic membrane cell that includes a pair of hydrogen-selective membranes according to the present disclosure.

FIG. 5 is a fragmentary cross-sectional view through schematic examples of membrane cell 200 of membrane module 44 according to the present disclosure. In the examples of FIG. 5, membrane cell 200 includes first hydrogen-selective membrane 270 and second hydrogen-selective membrane 272 that form the pair 202 of hydrogen-selective membranes 46. Fluid-permeable support structure 233 is positioned between and contacts first hydrogen-selective membrane 270 and second hydrogen-selective membrane 272. First hydrogen-selective membrane 270 is contacted by first mixed gas-side frame member 274 and first permeate-side frame member 278, such as discussed herein. Likewise, second hydrogen-selective membrane 272 is contacted by second mixed gas-side frame member 276 and second permeate-side frame member 280, such as discussed herein. As further shown, at least one of first mixed gas-side frame member 274 and second mixed gas-side frame member 276 is graphite frame member 250 and at least one of first permeate-side frame member 278 and second permeate-side frame member 280 is graphite frame member 250. In the examples of FIG. 5, the thickness $T_1$ of first permeate-side frame member 278 is less than the thickness $T_2$ of first mixed gas-side frame member 274. Likewise, the thickness of second permeate-side frame member 280 is less than the thickness of second mixed gas-side frame member 276.

Graphite frame members 250 according to the present disclosure may be flexible graphite frame members 252, which may be flexible in addition to including any of the features, functions, compositions, attributes and/or configurations discussed for graphite frame member 250. Flexible graphite frame member 252 may be configured to flex, deform, and/or resiliently deform such as to smooth surface variations and/or may be configured to be compressed against hydrogen-selective membrane 46 in a manner that prevents damage to hydrogen-selective membrane 46 and/or that prevents permeations from forming in inner membrane shell 222. As schematically illustrated in FIG. 5, hydrogen-selective membranes 46 may not be flat when supported by fluid-permeable support structure 233. More specifically, fluid-permeable support structure 233 may include a mesh screen structure and central region 230 of each hydrogen-selective membrane 46 may have an undulation A as it conforms to the shape of the mesh screen structure. Peripheral region 228 of each hydrogen-selective membrane 46 may have less undulation or a reduced undulation relative to central region 230. In particular, flexible graphite frame member 252 may smooth or cushion the surface variation in peripheral region 228 of fluid-permeable support structure 233 such as to provide a smoothed or cushioned support surface to hydrogen-selective membrane 46. With this in mind, permeate-side frame member 226 (see FIG. 2 and frame members 278, 280 in FIG. 5) may be flexible graphite frame member 252. That said, mixed gas-side frame member 224 may be flexible graphite frame member 252, such that flexible graphite frame member 252 may smooth any surface variations that may be present in feed assembly 210.

Figure 6:
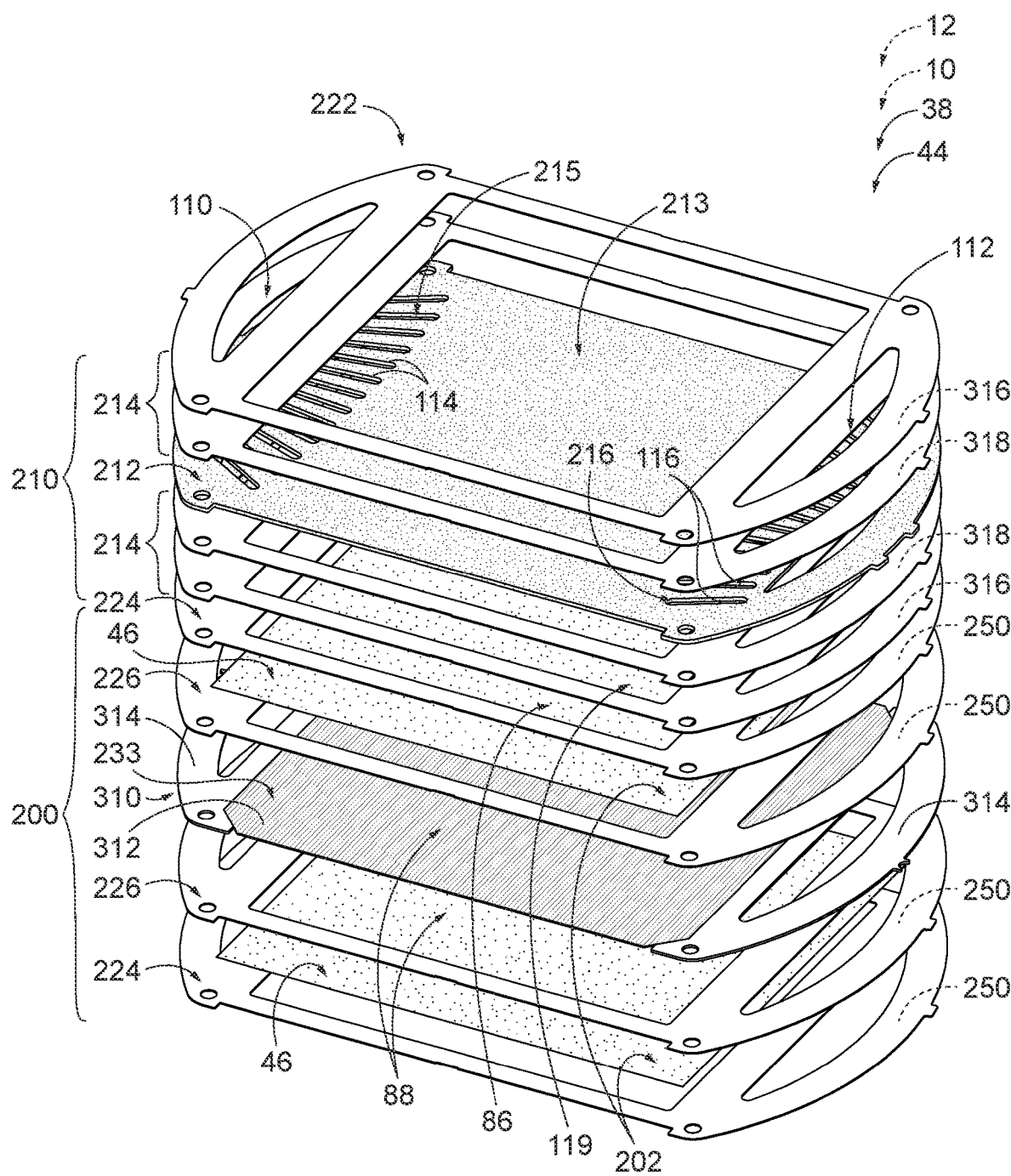
FIG. 6 is an exploded isometric view illustrating less schematic examples of membrane cells and feed plate assemblies according to the present disclosure.
Figure 7:
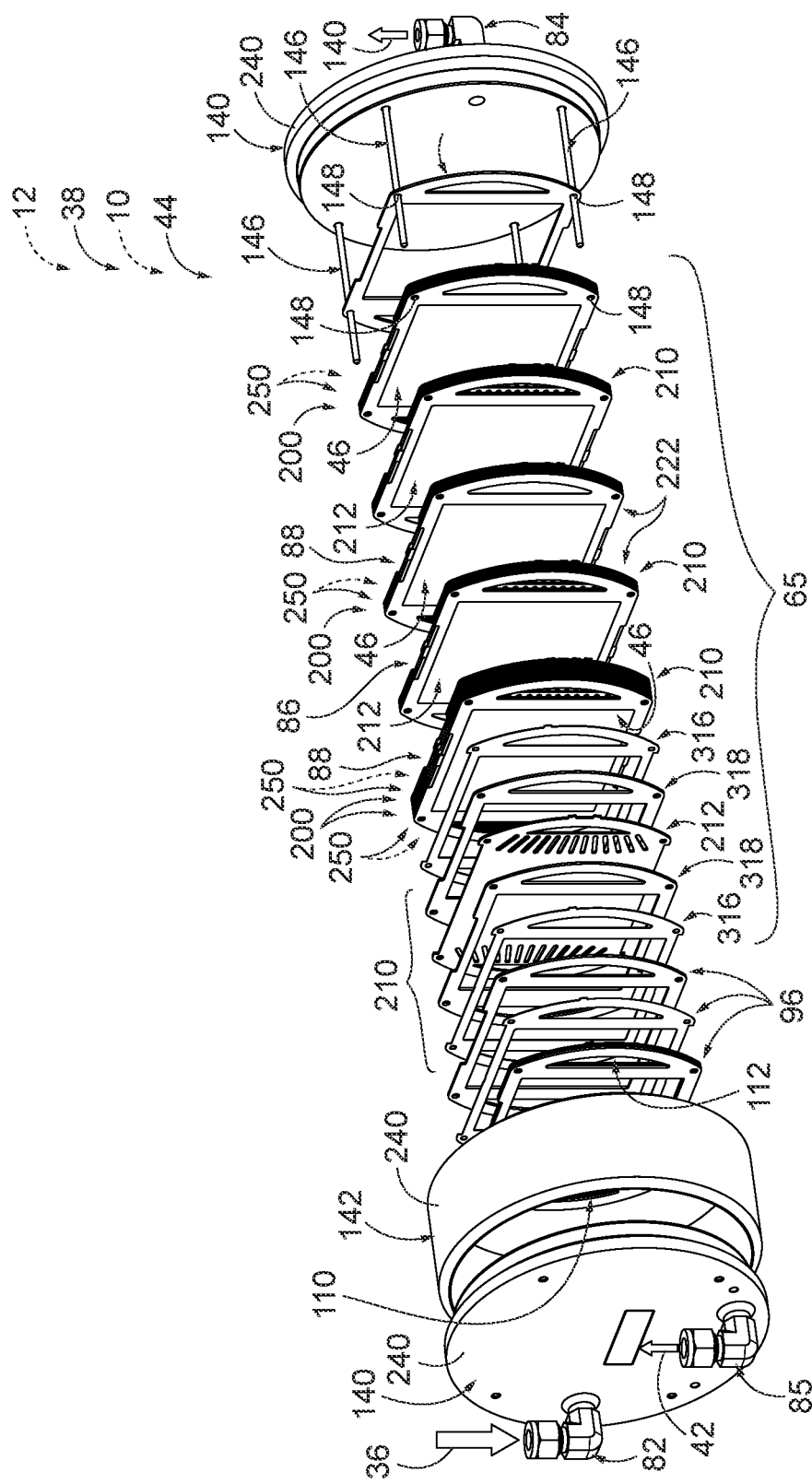
FIG. 7 is an exploded view of a membrane module that includes a plurality of membrane cells and forms at least a portion of a hydrogen purifier according to the present disclosure.

FIGS. 6-7 provide more detailed and/or less schematic illustrations of examples of membrane modules 44, of components of membrane modules 44, and/or of membrane-based hydrogen purifiers 38, and/or of fuel processors 12, and/or hydrogen-producing and consuming assemblies 10 that include and/or utilize hydrogen purifiers 38, according to the present disclosure. Hydrogen purifiers 38, membrane modules 44, fuel processors 12, and/or hydrogen-producing and consuming assemblies 10 may include any of the features, functions, structures, components, attributes, etc. discussed herein with reference to FIGS. 6-7 without requiring inclusion of all such features, functions, structures, components, attributes, etc. Similarly, all of the features, functions, structures, components, attributes, etc. of hydrogen purifiers 38, membrane modules 44, fuel processors 12, and/or hydrogen-producing and consuming assemblies 10 disclosed herein with reference to FIGS. 1-5 may be included in and/or utilized with the examples of FIGS. 6-7 without requiring inclusion of all such features, functions, structures, components, attributes, etc.

With initial reference to FIG. 6, illustrated therein is an exploded view showing examples of a membrane cell 200 and a corresponding feed assembly 210. As discussed herein, membrane cell 200 may include pair 202 of hydrogen-selective membranes 46 that are arranged about a common fluid-permeable support structure 233, such that pair 202 of hydrogen-selective membranes 46 may be described as defining a common permeate channel therebetween through which the purified hydrogen stream may be collected. Membrane cell 200 further includes mixed gas-side frame members 224 and permeate-side frame members 226 that are configured to support hydrogen-selective membranes 46 and that may be configured to seal, support, and/or interconnect membrane cells 200 when membrane module 44 includes a plurality of membrane cells. Further shown in FIG. 6, at least one permeate-side frame member 226 and/or at least one mixed gas-side frame member 224 is graphite frame member 250.

Fluid-permeable support structure 233 includes a screen structure 312 that fits within a permeate frame 314 and/or extends at least partially over the surface of permeate frame 314 to form a permeate plate assembly 310. A permeate-side frame member 226 extends and/or is positioned on each planar side of permeate plate assembly 310 and may be utilized to seal permeate plate assembly 310 to another structure of membrane cell 200, such as mixed gas-side frame member 224 and/or hydrogen-selective membrane 46.

A feed assembly 210 is positioned adjacent to membrane cell 200 to deliver the mixed gas stream to membrane cell 200, and remove the resulting hydrogen-depleted mixed gas stream and/or the byproduct stream from membrane cell 200. When membrane module 44 includes a plurality of membrane cells 200, feed assembly 210 may be positioned between adjacent membrane cells 200. As shown, feed assembly 210 includes feed plate 212 that may separate membrane cell 200 from another membrane cell and/or may separate membrane cell 200 from an end plate assembly. Feed plate 212 has a central region 213, as well as a supply region 215 and an exhaust region 216 defined on the periphery of feed plate 212. Central region 213 of feed plate 212 may be fluid impermeable, or at least substantially fluid impermeable. Supply region 215 fluidly connects a supply manifold 110 to mixed gas region 86 via one or more supply channels 114. Similarly, exhaust region 216 fluidly connects an exhaust manifold 112 to mixed gas region 86 via one or more exhaust channels 116. Supply channels 114 and exhaust channels 116 are formed through a thickness, or an entirety of the thickness, of feed plate 212.

Feed assembly 210 further includes feed frames 214 that are positioned on either side or face of feed plate 212. When feed assembly 210 interposes membrane cell 200 with an adjacent membrane cell, the feed frame 214 positioned opposite membrane cell 200 may interface and/or contact the adjacent membrane cell. When assembled, feed frames 214 overlap the periphery of each side of feed plate 212 and may create open volume 119 between central region 213 and the adjacent hydrogen-selective membrane 46, in which open volume 119 is formed by the thickness of feed frame 214 and the thickness of mixed gas-side frame member 224. Feed frame 214 may overlap a central portion of supply channels 114 and exhaust channels 116 but may not overlap with either end of supply channels 114 and exhaust channels 116. Thus, the mixed gas stream provided by supply manifold 110 may flow through supply channels 114 and underneath feed frame 214 and then into open volume 119. Similarly, the hydrogen-depleted mixed gas stream or the byproduct stream may flow from open volume 119 through exhaust channels 116 to exhaust manifold 112. Therefore, the width of feed frame 214 in the area that overlaps a central portion of supply channels 114 and exhaust channels 116 is necessarily smaller than the span, or length, of channels 114, 116 so that supply manifold 110 and exhaust manifold 112 are fluidly connected to the open volume 119.

As shown in FIG. 6, each feed frame 214 may comprise two or more separate parts. For example, feed frame 214 may include an outer feed frame member 316 and a feed plate gasket 318 interposed between outer feed frame member 316 and feed plate 212. In this way, feed plate gasket 318 may be configured to contact feed plate 212 while outer feed frame member 316 may be configured to contact another structure of membrane module 44, such as mixed gas-side frame member 224.

When assembled, mixed gas-side frame members 224, permeate-side frame members 226, hydrogen-selective membranes 46, permeate frame 314, and feed assembly 210 may be compressed against one another to form a portion of inner membrane shell 222, which may isolate permeate region 88 from supply manifold 110, exhaust manifold 112, and/or mixed gas region 86. Screen structure 312 forms the peripheral region along two sides of permeate plate assembly 310 to permit hydrogen gas that diffuses through hydrogen-selective membranes 46 to flow from inner membrane shell 222 and be collected as the purified hydrogen stream. Permeate frame 314 forms the peripheral region of the other two sides of permeate plate assembly 310 to form a fluid seal with permeate-side frame members 226 and isolate permeate region 88 from mixed gas region 86, supply manifold 110, and/or exhaust manifold 112.

Turning to FIG. 7, illustrated therein is an exploded isometric view illustrating an example of membrane module 44 that may be configured to be used in or as hydrogen purifier 38 according to the present disclosure. Membrane module 44 includes a plurality of membrane cells 200 and a plurality of feed assemblies 210 positioned between membrane cells 200. Membrane cells 200 and feed assemblies 210 collectively may be referred to as forming a membrane stack 65, which may be described as forming inner membrane shell 222 that is configured to prevent gasses other than hydrogen gas that are contained in mixed gas region 86, exhaust manifold 112, and/or supply manifold 110 from entering the permeate region 88. As further shown, each membrane cell 200 includes at least one graphite frame member 250 that supports hydrogen-selective membrane 46 and may form a portion of inner membrane shell 222, such as discussed herein.

When assembled, membrane cells 200 and feed assemblies 210 are stacked between two end plates 140 and enclosed in a cylindrical enclosure 142. End plates 140 and cylindrical enclosure 142 may form portions of outer membrane shell 240 that may enclose at least a portion of permeate region 88. In this example, feed assemblies 210 include feed plate 212 positioned between outer feed frame members 316 and feed plate gaskets 318. A feed assembly 210 is positioned on the end of membrane stack 65 nearest mixed gas inlet 82 such that feed assembly 210 interposes membrane cells 200 and mixed gas inlet 82.

In the example of FIG. 7, membrane module 44 further includes at least one compliance gasket 96 that is positioned between membrane stack 65 and end plates 140. Compliance gasket(s) 96 may compensate for the variance in tolerance of the dimensions of the metal components of the membrane cells 200 and/or feed assemblies 210 and/or for the variance in dimensions due to the assembly of the membrane cells 200, for example, through welding or other assembling methods (e.g., bolting). Compliance gasket(s) 96 may allow for a larger range of displacement during the assembly process while maintaining the load applied to the membrane packs within acceptable limits. Several thinner compliance gaskets may be used, for example, or one thicker gasket. In other words, a desired overall thickness of the compliance gasket or compliance gaskets may be achieved by either one thick gasket or several thinner gaskets.

End plates 140 optionally may be mechanically fastened to one another via rods 146, which may extend through bores 148 disposed about the peripheral region of membrane stack 65 and compliance gaskets 96. Rods 146 may be utilized to align the component parts of membrane stack 65 with one another.

As shown in FIG. 7, membrane module 44 also includes a mixed gas inlet 82 through which mixed gas stream 36 is supplied to supply manifold 110. From supply manifold 110, mixed gas stream 36 may be divided between membrane cells 200 and flow across membrane cells 200 towards exhaust manifold 112. Byproduct outlet 84 is provided in membrane module 44 to receive byproduct stream 40 from exhaust manifold 112 and exhaust byproduct stream 40 from membrane module 44, and purified hydrogen outlet 85 is provided to remove purified hydrogen stream 42 from permeate region 88.

Figure 8:
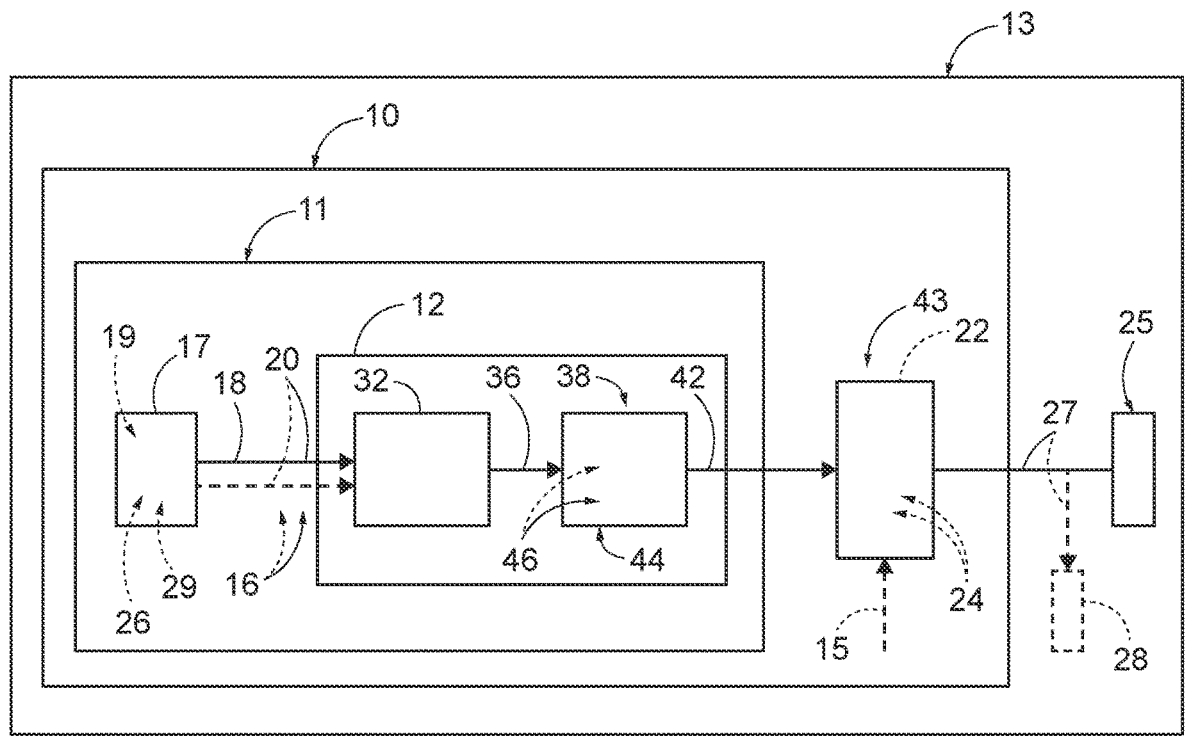
FIG. 8 is a schematic representation of hydrogen purifiers included in a hydrogen-producing fuel processing system, which optionally forms a portion of a hydrogen-producing and consuming assembly according to the present disclosure.

FIG. 8 schematically represents examples in which hydrogen purifier 38 is included in and/or utilized with a hydrogen-producing fuel processing system 11, a hydrogen-producing and consuming assembly 10, and/or an energy-producing and consuming assembly 13. As shown, hydrogen-producing fuel processing system 11 includes fuel processor 12, such as any of the fuel processors 12 discussed herein with reference to FIG. 1, and a feed stream delivery system 17 that is configured to deliver one or more feed streams 16 to fuel processor 12. Feed stream delivery system 17 delivers a feed stream 16 that contains carbon-containing feedstock 18 and optionally contains water 20. Feed stream delivery system 17 may deliver feed stream 16 to fuel processor 12 through one or more streams. When carbon-containing feedstock 18 is miscible with water, carbon-containing feedstock 18 may be delivered with water 20 in feed stream 16, such as shown in solid lines in FIG. 8. When carbon-containing feedstock 18 is immiscible, or only slightly miscible, with water, these components typically are delivered to fuel processor 12 as, or in, separate, or distinct, feed streams 16 as indicated in dashed lines in FIG. 8. Separate feed streams, when utilized, may be combined within the fuel processor. In a further example, the carbon-containing feedstock 18 and/or water 20 may be vaporized and delivered as a single feed stream. Feed stream delivery system 17 may include one or more pumps 26 that may deliver the components of feed stream 16 from one or more respective supplies 19. Feed stream delivery system 17 additionally or alternatively may include a valve assembly 29 configured to regulate the flow of the components of feed stream 16 from at least one pressurized supply 19. Supply 19 may be located external of hydrogen-producing fuel processing system 11, and/or may be contained within, or adjacent, hydrogen-producing fuel processing system 11.

Hydrogen purifiers 38 also may be included in and/or utilized with a hydrogen-producing and consuming assembly 10. As shown in FIG. 8, hydrogen-producing and consuming assembly 10 includes hydrogen-producing fuel processing system 11 and a hydrogen-consuming assembly 43 that is configured to receive purified hydrogen stream 42 from hydrogen-producing fuel processing system 11 and consume, or otherwise utilize, at least a portion of purified hydrogen stream 42. As an example, hydrogen-consuming assembly 43 may be, or include, a fuel cell stack 22 that is configured to generate an electrical power output 27 from purified hydrogen stream 42. Fuel cell stack 22 contains at least one, and typically multiple, fuel cells 24 that are configured to produce an electrical current from the portion of purified hydrogen stream 42 that is delivered thereto and an oxidant 15, such as oxygen gas. Examples of suitable fuel cells include proton exchange membrane (PEM) fuel cells and alkaline fuel cells. Fuel cell stack 22 may receive some or all of purified hydrogen stream 42. Additionally or alternatively, at least a portion of purified hydrogen stream 42 may be delivered for use in another hydrogen-consuming process, such as burned for heat and/or stored for later use. Electrical power output 27 produced by fuel cell stack 22 may be utilized to satisfy the energy demands, or applied load, of an energy-consuming device 25. As examples, energy-consuming device 25 may include a motor vehicle, a recreational vehicle, a boat, a tool, a light or lighting assemblies, an appliance (such as a household, commercial, or industrial appliance), a dwelling, a building, signaling equipment, communication equipment, etc. Additionally or alternatively, electrical power output 27 may be stored for later use in an energy storage device 28, which may include any suitable device for storing electrical energy, such as one or more batteries. When electrical power output 27 produced by fuel cell stack 22 is supplied to energy-consuming device 25 and/or energy storage device 28, hydrogen purifier 38 may be described as being included in and/or utilized with an energy-producing and consuming assembly 13, such as shown in FIG. 8.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

Examples of membrane-based hydrogen purifiers, fuel processors, fuel processing systems, and hydrogen-producing and consuming assemblies according to the present disclosure are presented in the following enumerated paragraphs.

A1. A hydrogen purifier comprising a hydrogen-separation membrane module, the membrane module comprising:
  at least one membrane cell, comprising:
  (i) a hydrogen-selective membrane defining a permeate face and an opposed mixed gas face;
  (ii) a fluid-permeable support structure that physically contacts and supports at least a central region of the permeate face;
  (iii) a permeate-side frame member interposed between the hydrogen-selective membrane and the fluid-permeable support structure such that the permeate-side frame member physically contacts a peripheral region of the permeate face and a peripheral region of the fluid-permeable support;
  (iv) a mixed gas-side frame member that physically contacts a peripheral region of the mixed gas face; and
  wherein at least one of the permeate-side frame member and the mixed gas-side frame member is a graphite frame member.

A2. The membrane module of paragraph A1, wherein the graphite frame member comprises at least 99 weight percent (wt %) carbon.

A2.1. The membrane module of any of paragraphs A1-A2, wherein the mixed gas-side frame member is the graphite frame member.

A2.2. The membrane module of any of paragraphs A1-A2.1, wherein the permeate-side frame member is the graphite frame member.

A2.3. The membrane module of any of paragraphs A1-A2.2, wherein the mixed gas-side frame member and the permeate-side frame member are graphite frame members.

A2.4. The membrane module of any of paragraphs A2-A2.3, wherein the graphite frame member comprises at least one of at least 99.1 wt % carbon, 99.2 wt % carbon, 99.3 wt % carbon, 99.4 wt % carbon, 99.5 wt % carbon, at least 99.6 wt % carbon, at least 99.7 wt % carbon, at least 99.8 wt % carbon, and at least 99.9 wt % carbon.

A2.5 The membrane module of paragraph A2.4, wherein the graphite frame member comprises at most 99.999 wt % carbon.

A2.6. The membrane module of any of paragraphs A2-A2.5, wherein the graphite frame member is a flexible graphite frame member.

A3. The membrane module of any of paragraphs A1-A2.6, wherein each of the mixed gas-side frame member, the permeate-side frame member, and the graphite frame member comprises granular particulate.

A3.1. The membrane module of paragraph A3, wherein the graphite frame member comprises at most 1 wt % granular particulate, at most 0.9 wt % granular particulate, at most 0.8 wt % granular particulate, at most 0.7 wt % granular particulate, at most 0.6 wt % granular particulate, at most 0.5 wt % granular particulate, at most 0.4 wt % granular particulate, at most 0.3 wt % granular particulate, at most 0.2 wt % granular particulate, at most 0.1 wt % granular particulate, or at most 0.01 wt % granular particulate.

A3.2. The membrane module of paragraph A3.1, wherein the graphite frame member comprises at least 0.001 wt % granular particulate.

A4. The membrane module of any of paragraphs A3-A3.2, wherein the granular particulate of the graphite frame member is fine granular particulate that consists of granular particles having a maximum dimension that is at most 400 micrometers.

A4.1. The membrane module of paragraph A4, wherein the fine granular particulate consists of granular particles having a maximum dimension that is at least one of at most 300 micrometers, at most 200 micrometers, at most 150 micrometers, at most 100 micrometers, at most 80 micrometers, at most 60 micrometers, at most 40 micrometers, at most 20 micrometers, at most 10 micrometers, at most 5 micrometers, at most 1 micrometer, at most 0.5 micrometers, and at most 0.2 micrometers.

A4.2 The membrane module of paragraph A4.1, wherein the maximum dimension of the fine granular particulate is at least 0.1 micrometers.

A5. The membrane module of any of paragraphs A3-A4.2, wherein the granular particulate comprises one or more of ash, MgO, $Al_2O_3$, $SiO_2$, CaO, and $Fe_2O_3$.

A6. The membrane module of any of paragraphs A1-A5, wherein each of the mixed gas-side frame member, the permeate-side frame member, and the graphite frame member comprise sulfur.

A6.1. The membrane module of paragraph A6, wherein the graphite frame member comprises at least one of at most 450 ppm sulfur, at most 400 ppm sulfur, at most 350 ppm sulfur, at most 300 ppm sulfur, at most 250 ppm sulfur, at most 200 ppm sulfur, at most 100 ppm sulfur, at most 50 ppm sulfur, and at most 20 ppm sulfur.

A6.2. The membrane module of paragraph A6.1, wherein the graphite frame member comprises at least 1 ppm sulfur.

A7. The membrane module of any of paragraphs A1-A6.2, wherein the permeate-side frame member, the mixed gas side frame member, and the graphite frame member comprise a halide.

A7.1. The membrane module of paragraph A7, wherein the graphite frame member comprises at least one of at most 100 ppm halide, at most 80 ppm halide, at most 60 ppm halide, at most 40 ppm halide, at most 20 ppm halide, at most 10 ppm halide, and at most 1 ppm halide.

A7.2. The membrane module of paragraph A7.1, wherein the graphite frame member comprises at least 0.2 ppm halide.

A7.3. The membrane module of any of paragraphs A7-A7.2, wherein the halide includes one or more of a chloride and a bromide.

A8. The membrane module of any of paragraphs A1-A7.3, wherein the mixed gas-side frame member is configured to form a fluid seal with the peripheral region of the mixed gas face of the hydrogen-selective membrane and a peripheral region of a feed assembly.

A8.1. The membrane module of any of paragraphs A1-A8, wherein the permeate-side frame member is configured to form a fluid seal with the peripheral region of the permeate face of the hydrogen-selective membrane.

A9. The membrane module of any of paragraphs A1-A8.1, wherein the permeate-side frame member is configured to support the peripheral region of the permeate face of the hydrogen-selective membrane.

A9.1 The membrane module of any of paragraphs A1-A9, wherein the mixed gas-side frame member is configured to support the peripheral region of the mixed gas face of the hydrogen-selective membrane and a/the peripheral region of a/the feed assembly.

A10. The membrane module of any of paragraphs A1-A9.1, wherein a/the membrane-contacting face of the graphite frame member is a smooth surface, and wherein the smooth surface is configured to form a perforation-free fluid seal with the hydrogen-selective membrane.

A11. The membrane module of any of paragraphs A1-A10, wherein the mixed gas-side frame member and the permeate-side frame member are compressed against the hydrogen-selective membrane with a pressure of at least one of at least 2000 pounds per square inch (psi) (13.8 MPa (Mega Pascal)), at least 2900 psi (20 MPa), at least 3000 psi (20.7 MPa), at least 3200 psi (22.1 MPa), at least 3400 psi (23.4 MPa), at least 3600 psi (24.8 MPa), and/or at most 3100 psi (21.4 MPa), at most 3200 psi (22.1 MPa), at most 3600 psi (24.8 MPa), at most 3700 psi (25.5 MPa), at most 3800 psi (26.2 MPa), and at most 4000 psi (27.6 MPa).

A12. The membrane module of any of paragraphs A1-A11, wherein the hydrogen-selective membrane has a membrane thickness, and wherein the membrane thickness is at least one of at most 25 microns, at most 20 microns, at most 15 microns, at most 10 microns, at most 5 microns, at least 1 micron, at least 2 microns, at least 4 microns, at least 6 microns, at least 8 microns, at least 10 microns, and at least 12 microns.

A12.1. The membrane module of any of paragraphs A1-A12, wherein the hydrogen-selective membrane is formed from at least one of a metal, a noble metal, a metal alloy, a binary alloy, a ternary alloy, palladium, a palladium alloy, a palladium-copper (Pd—Cu) alloy, a palladium-yttrium alloy, and a palladium-ruthenium alloy.

A12.2. The membrane module of paragraph A12.1, wherein the hydrogen-selective membrane includes the Pd—Cu Alloy, and wherein the Pd—Cu alloy has a copper composition of at least one of at least 15 wt %, at least 20 wt %, at least 25 wt %, at least 30 wt %, at least 35 wt %, at least 40 wt %, at least 45 wt %, at least 50 wt %, and/or at most 60 wt %, at most 55 wt %, at most 53 wt %, at most 50 wt %, at most 45 wt %, at most 40 wt %, at most 35 wt %, at most 30 wt %, and at most 25 wt %.

A12.3 The membrane module of any of paragraphs A1-A12.1, wherein the fluid-permeable support structure includes one or more of a screen structure, one or more mesh screens, one or more fine mesh screens, and one or more coarse mesh screens.

A13. The membrane module of any of paragraphs A1-A12.3, wherein a thickness of the permeate-side frame member is less than a thickness of the mixed gas-side frame member.

A13.1. The membrane module of paragraph A13, wherein the thickness of the permeate-side frame member is less than 95%, less than 90%, less than 85%, less than 80%, less than 75%, less than 70%, less than 65%, less than 60%, less than 55%, less than 52%, less than 50%, or less than 45% of the thickness of the mixed gas-side frame member.

A14. The membrane module of any of paragraphs A1-A13, wherein the permeate-side frame member has a permeate-side frame member density, and further wherein the mixed gas-side frame member has a mixed gas-side frame member density that is less than a threshold fraction of the permeate-side frame member density, wherein the threshold fraction is 95%, 90%, 85%, 80%, 78%, 75%, 70%, or 65%.

A15. The membrane module of any of paragraphs A1-A11, wherein the graphite frame member has a density of at least one of:

(i) at least 0.7 grams per cubic centimeter (g/cc), at least 0.8 g/cc, at least 0.9 g/cc, at least 1 g/cc, at least 1.1 g/cc, at least 1.2 g/cc, at least 1.3 g/cc, at least 1.4 g/cc, and at least 1.5 g/cc; and (ii) at most 1.8 g/cc, at most 1.7 g/cc, at most 1.6 g/cc, at most 1.5 g/cc, at most 1.4 g/cc, at most 1.3 g/cc, at most 1.2 g/cc, at most 1.1 g/cc, and at most 1 g/cc.

A16. The membrane module of any of paragraphs A1-A15, wherein the at least one membrane cell includes a pair of hydrogen-selective membranes, wherein the hydrogen-selective membrane is a first hydrogen-selective membrane of the pair of hydrogen-selective membranes, in which the permeate face is a first permeate face and the mixed gas face is a first mixed gas face, the mixed gas-side frame member is a first mixed gas-side frame member, and the permeate-side frame member is a first permeate-side frame member, wherein the at least one membrane cell further includes:

(i) a second hydrogen-selective membrane of the pair of hydrogen-selective membranes, wherein the second hydrogen-selective membrane defines a second permeate face and an opposed second mixed gas face, wherein the fluid-permeable support structure is positioned between the first hydrogen-selective membrane and the second hydrogen-selective membrane such that the fluid-permeable support structure physically contacts at least the central region of the first permeate face and at least the central region of the second permeate face and also such that the central region of the first permeate face is spaced-apart from the central region of the second permeate face;

(ii) a second permeate-side frame member interposed between the second hydrogen-selective membrane and the fluid-permeable support structure such that the second permeate-side frame member physically contacts a peripheral region of the second permeate face and the peripheral region of the fluid-permeable support structure; and (iii) a second mixed gas-side frame member that physically contacts a peripheral region of the second mixed gas face.

16.1. The membrane module of paragraph A16, wherein the second permeate-side frame member supports the peripheral region of the second permeate face and the peripheral region of the fluid-permeable support structure.

16.2. The membrane module of any of paragraphs A16-A16.1, wherein the second permeate-side frame member forms a fluid seal with the peripheral region of the second permeate face and the peripheral region of the fluid-permeable support structure.

16.3 The membrane module of any of paragraphs A16-A16.2, wherein the second mixed gas-side frame member forms a fluid seal with the peripheral region of the second mixed gas face.

16.4. The membrane module of any of paragraphs A16-A16.3, wherein second mixed gas-side frame member supports a peripheral region of the second mixed gas face.

A17. The membrane module of any of paragraphs A16-A16.4, wherein at least one of the second permeate-side frame member and the second mixed gas-side frame member is the graphite frame member.

A18. The membrane module of any of paragraphs A1-A17, wherein the membrane module comprises a plurality of membrane cells.

A18.1. The membrane module of paragraph A18, wherein the plurality of membrane cells includes a stack of membrane cells, and wherein the membrane module comprises a corresponding feed plate assembly that is positioned between each adjacent pair of membrane cells in the stack of membrane cells.

A19. A hydrogen purifier that includes the membrane module of any of paragraphs A1-A18.1, wherein the hydrogen purifier is configured to receive a mixed gas stream that includes hydrogen gas and one or more other gasses and to separate the mixed gas stream into a purified hydrogen stream and a byproduct stream.

A19.1. The membrane module of paragraph A19, wherein the hydrogen-selective membrane separates the hydrogen-separation membrane module into a mixed gas region and a permeate region, wherein the membrane module is configured to receive the mixed gas stream in the mixed gas region, and wherein the hydrogen-selective membrane is configured to permit the hydrogen gas contained within the mixed gas stream to diffuse through the hydrogen-selective membrane to the permeate region to separate the mixed gas stream into the purified hydrogen stream and the byproduct stream, and wherein the purified hydrogen stream is the portion of the mixed gas stream that diffuses through the hydrogen-selective membrane.

A20. A fuel processor, comprising:

a hydrogen-producing region configured to receive a feed stream and to produce a/the mixed gas stream from the feed stream; and the hydrogen purifier including the membrane module of any of paragraphs A1-A19.1, wherein the membrane module is configured to receive the mixed gas stream and to separate the mixed gas steam into a/the purified hydrogen stream and a/the byproduct stream.

A21. The fuel processor of paragraph A20, wherein the hydrogen-producing region includes a reforming region containing a reforming catalyst.

A22. A fuel processing system comprising the fuel processor of any of paragraphs A20-A21, wherein the fuel processing system further includes a feed stream delivery system configured to supply the feed stream to the hydrogen-producing region.

A23. A hydrogen-producing and consuming assembly comprising the fuel processing system of paragraph A22; and a fuel cell stack, wherein the fuel cell stack is configured to receive the purified hydrogen stream from the fuel processor and to generate an electric current from the purified hydrogen stream.

A24. The hydrogen-producing and consuming assembly of paragraph A23, further comprising an energy-consuming device configured to receive the electrical current from the fuel cell stack.

INDUSTRIAL APPLICABILITY

The hydrogen purifiers, fuel processors, fuel processing systems, and hydrogen-producing and consuming assemblies disclosed herein are applicable to hydrogen- and energy-production industries, including the fuel cell industries.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

As used herein, "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, an object that is at least substantially formed from a material includes an object for which at least 75% of the object is formed from the material and also includes an object that is completely formed from the material. As another example, a first direction that is at least substantially parallel to a second direction includes a first direction that forms an angle with respect to the second direction that is at most 22.5 degrees and also includes a first direction that is exactly parallel to the second direction. As another example, a first length that is substantially equal to a second length includes a first length that is at least 75% of the second length, a first length that is equal to the second length, and a first length that exceeds the second length such that the second length is at least 75% of the first length.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A hydrogen purifier comprising a hydrogen-separation membrane module, the membrane module comprising:
   at least one membrane cell, comprising:
   (i) a hydrogen-selective membrane defining a permeate face and an opposed mixed gas face;
   (ii) a fluid-permeable support structure that physically contacts and supports at least a central region of the permeate face;
   (iii) a permeate-side frame member interposed between the hydrogen-selective membrane and the fluid-permeable support structure such that the permeate-side frame member physically contacts a peripheral region of the permeate face and a peripheral region of the fluid-permeable support structure;
   (iv) a mixed gas-side frame member that physically contacts a peripheral region of the mixed gas face of the hydrogen-selective membrane;
   wherein at least one of the permeate-side frame member and the mixed gas-side frame member is a graphite frame member; and
   wherein the graphite frame member comprises a granular particulate having a non-graphite composition, wherein the granular particulate consists of granular particles having a maximum dimension that is at most 400 micrometers and at least 0.01 micrometers.

2. The hydrogen purifier of claim 1, wherein the graphite frame member comprises at least 99 weight percent (wt %) carbon.

3. The hydrogen purifier of claim 1, wherein the mixed gas-side frame member is the graphite frame member.

4. The hydrogen purifier of claim 1, wherein the permeate-side frame member is the graphite frame member.

5. The hydrogen purifier of claim 1, wherein the mixed gas-side frame member and the permeate-side frame member are graphite frame members.

6. The hydrogen purifier of claim 1, wherein the graphite frame member comprises at least 99.8 wt % carbon and at most 99.999 wt % carbon.

7. The hydrogen purifier of claim 1, wherein the graphite frame member is a flexible graphite frame member.

8. The hydrogen purifier of claim 1, wherein the graphite frame member comprises at least 0.001 wt % granular particulate, and wherein the graphite frame member comprises at most 1 wt % granular particulate, at most 0.9 wt % granular particulate, at most 0.8 wt % granular particulate, at most 0.7 wt % granular particulate, at most 0.6 wt % granular particulate, at most 0.5 wt % granular particulate, at most 0.4 wt % granular particulate, at most 0.3 wt % granular particulate, at most 0.2 wt % granular particulate, at most 0.1 wt % granular particulate, or at most 0.01 wt % granular particulate.

9. The hydrogen purifier of claim 1, wherein the granular particulate comprises one or more of ash, MgO, $Al_2O_3$, $SiO_2$, CaO, and $Fe_2O_3$.

10. The hydrogen purifier of claim 1, wherein each of the mixed gas-side frame member, the permeate-side frame member, and the graphite frame member comprise sulfur, wherein the graphite frame member comprises at least 1 ppm sulfur, and wherein the graphite frame member comprises at least one of at most 450 ppm sulfur, at most 400 ppm sulfur, at most 350 ppm sulfur, at most 300 ppm sulfur, at most 250 ppm sulfur, at most 200 ppm sulfur, at most 100 ppm sulfur, at most 50 ppm sulfur, and at most 20 ppm sulfur.

11. The hydrogen purifier of claim 1, wherein the permeate-side frame member, the mixed gas-side frame member, and the graphite frame member comprise a halide, wherein the graphite frame member comprises at least 0.2 ppm halide, and wherein the graphite frame member comprises at least one of at most 100 ppm halide, at most 80 ppm halide, at most 60 ppm halide, at most 40 ppm halide, at most 20 ppm halide, at most 10 ppm halide, and at most 1 ppm halide.

12. The hydrogen purifier of claim 1, wherein the graphite frame member comprises a membrane-contacting face that physically contacts and supports the peripheral region of the mixed gas face of the hydrogen-selective membrane or the permeate face of the hydrogen-selective membrane, wherein the membrane-contacting face of the graphite frame member comprises a surface roughness resulting from the granular particulate having a maximum amplitude ($R_p$) of at least 0.01 micrometers and at most 400 micrometers, at most 300 micrometers, at most 200 micrometers, at most 150 micrometers, at most 100 micrometers, at most 50 micrometers, at most 25 micrometers, at most 10 micrometers, at most 5 micrometers, at most 1 micrometer, at most 0.5 micrometers, or at most 0.2 micrometers.

13. The hydrogen purifier of claim 1, wherein the hydrogen-selective membrane has a membrane thickness, and wherein the membrane thickness is at least one of at most 25 microns, at most 20 microns, at most 15 microns, at most 10 microns, at most 5 microns, at least 1 micron, at least 2 microns, at least 4 microns, at least 6 microns, at least 8 microns, at least 10 microns, and at least 12 microns.

14. The hydrogen purifier of claim 1, wherein the graphite frame member has a density of at least one of:
(i) at least 0.7 grams per cubic centimeter (g/cc), at least 0.8 g/cc, at least 0.9 g/cc, at least 1 g/cc, at least 1.1 g/cc, at least 1.2 g/cc, at least 1.3 g/cc, at least 1.4 g/cc, and at least 1.5 g/cc; and
(ii) at most 1.8 g/cc, at most 1.7 g/cc, at most 1.6 g/cc, at most 1.5 g/cc, at most 1.4 g/cc, at most 1.3 g/cc, at most 1.2 g/cc, at most 1.1 g/cc, and at most 1 g/cc.

15. The hydrogen purifier of claim 1, wherein the permeate-side frame member supports the peripheral region of the permeate face of the hydrogen-selective membrane, and further wherein the mixed gas-side frame member forms a fluid seal with the peripheral region of the mixed gas face of the hydrogen-selective membrane.

16. The hydrogen purifier of claim 1, wherein the at least one membrane cell includes a pair of hydrogen-selective membranes, wherein the hydrogen-selective membrane is a first hydrogen-selective membrane of the pair of hydrogen-selective membranes, in which the permeate face is a first permeate face and the mixed gas face is a first mixed gas face, the mixed gas-side frame member is a first mixed gas-side frame member, and the permeate-side frame member is a first permeate-side frame member, wherein the at least one membrane cell further includes:
(i) a second hydrogen-selective membrane of the pair of hydrogen-selective membranes, wherein the second hydrogen-selective membrane defines a second permeate face and an opposed second mixed gas face, wherein the fluid-permeable support structure is positioned between the first hydrogen-selective membrane and the second hydrogen-selective membrane such that the fluid-permeable support structure physically contacts at least the central region of the first permeate face and at least the central region of the second permeate face and also such that the central region of the first permeate face is spaced-apart from the central region of the second permeate face;
(ii) a second permeate-side frame member interposed between the second hydrogen-selective membrane and the fluid-permeable support structure such that the second permeate-side frame member physically contacts a peripheral region of the second permeate face and the peripheral region of the fluid-permeable support structure;
(iii) a second mixed gas-side frame member that physically contacts a peripheral region of the second mixed gas face; and
wherein at least one of the second permeate-side frame member and the second mixed gas-side frame member is the graphite frame member.

17. The hydrogen purifier of claim 16, wherein the second permeate-side frame member supports the peripheral region of the second permeate face and the peripheral region of the fluid-permeable support structure, and further wherein the second mixed gas-side frame member forms a fluid seal with the peripheral region of the second mixed gas face.

18. The hydrogen purifier of claim 1, wherein the membrane module comprises a plurality of membrane cells.

19. The hydrogen purifier of claim 1, wherein the hydrogen purifier is configured to receive a mixed gas stream that includes hydrogen gas and one or more other gasses and to separate the mixed gas stream into a purified hydrogen stream and a byproduct stream, wherein the hydrogen-selective membrane separates the hydrogen-separation membrane module into a mixed gas region and a permeate region, wherein the membrane module is configured to receive the mixed gas stream in the mixed gas region, and wherein the hydrogen-selective membrane is configured to permit the hydrogen gas contained within the mixed gas stream to diffuse through the hydrogen-selective membrane to the permeate region to separate the mixed gas stream into the purified hydrogen stream and the byproduct stream, and wherein the purified hydrogen stream is the portion of the mixed gas stream that diffuses through the hydrogen-selective membrane.

20. A fuel processor, comprising:
a hydrogen-producing region configured to receive a feed stream and to produce the mixed gas stream from the feed stream; and
the hydrogen purifier of claim 19, wherein the hydrogen purifier is configured to receive the mixed gas stream and to separate the mixed gas stream into the purified hydrogen stream and the byproduct stream.

21. The hydrogen purifier of claim 1, wherein the granular particulate comprises a hardness greater than the hardness of a remainder of the graphite frame member.

22. The hydrogen purifier of claim 1, wherein the granular particulate of the graphite frame member is fine granular particulate, wherein the fine granular particulate produces reduced surface roughness in the graphite frame member relative to a coarse granular particulate.

* * * * *